(12) United States Patent
Chong

(10) Patent No.: US 12,447,187 B2
(45) Date of Patent: Oct. 21, 2025

(54) COMPOSITION FOR PREVENTING AND TREATING INFLAMMATORY BOWEL DISEASE INCLUDING PUER TEA EXTRACT

(71) Applicant: Kyong-Won Chong, Seoul (KR)

(72) Inventor: Kyong-Won Chong, Seoul (KR)

(*) Notice: Subject to any disclaimer, the term of this patent is extended or adjusted under 35 U.S.C. 154(b) by 0 days.

(21) Appl. No.: 17/848,981

(22) Filed: Jun. 24, 2022

(65) Prior Publication Data

US 2022/0409689 A1   Dec. 29, 2022

(30) Foreign Application Priority Data

Jun. 29, 2021   (KR) .................. 10-2021-0084841

(51) Int. Cl.
| | |
|---|---|
| A61K 36/82 | (2006.01) |
| A23F 3/16 | (2006.01) |
| A23F 3/18 | (2006.01) |
| A23K 10/30 | (2016.01) |
| A23L 33/105 | (2016.01) |
| A61P 1/00 | (2006.01) |
| A61P 29/00 | (2006.01) |

(52) U.S. Cl.
CPC ............ *A61K 36/82* (2013.01); *A23F 3/16* (2013.01); *A23F 3/18* (2013.01); *A23L 33/105* (2016.08); *A61P 1/00* (2018.01); *A61P 29/00* (2018.01); *A23V 2002/00* (2013.01); *A61K 2236/33* (2013.01); *A61K 2236/35* (2013.01); *A61K 2236/39* (2013.01)

(58) Field of Classification Search
None
See application file for complete search history.

(56) References Cited

FOREIGN PATENT DOCUMENTS

| CN | 101856434 A | * | 10/2010 |
|---|---|---|---|
| CN | 107873900 A | * | 4/2018 |
| CN | 108680526 A | * | 10/2018 |
| CN | 112889967 A | * | 6/2021 |

(Continued)

OTHER PUBLICATIONS

CN101856434A—EPO English Translation (Year: 2010).*

(Continued)

*Primary Examiner* — Kyung S Chang
(74) *Attorney, Agent, or Firm* — Sughrue Mion, PLLC

(57) ABSTRACT

Provided is a method for preventing and alleviating inflammatory bowel disease by administering a composition including puer tea extract as an active ingredient to a subject in need thereof. Puer tea extract of the present disclosure showed an effect of improving damaged colonic tissue in a mouse model of acute ulcerative colitis induced by dextran sulfate sodium (DSS), and showed an inhibitory effect on clinical symptoms of the disease activity index (DAT) of weight loss, diarrhea, and rectal bleeding. In addition, puer tea extract inhibited the expression of inflammatory cytokines TNF-α and IL-6 in the colonic tissue and inhibited the inflammatory response through inhibition of the activity of NF-κB, an anti-inflammatory mechanism. In addition, the DPPH free radical and ABTS free radical scavenging ability increased proportionally as the concentration of puer tea extract increased at the cellular level, and COX-2 expression was inhibited in LPS-activated macrophages.

18 Claims, 13 Drawing Sheets

(56) References Cited

FOREIGN PATENT DOCUMENTS

| KR | 10-1292099 B1 | | 8/2013 |
|---|---|---|---|
| KR | 102249398 B | * | 5/2021 |

OTHER PUBLICATIONS

CN107873900A _ EPO English Translation (Year: 2017).*
CN112889967A—EPO English Translation (Year: 2021).*
Ge et al.,. "Deciphering superior quality of Pu-erh tea from thousands of years' old trees based on the chemical profile", Food Chemistry 358 (Mar. 2021), pp. 1-10. (Year: 2021).*
CN108680526A—Google English Translation [(received from on-line website: https://patents.google.com/patent/CN108680526A/en?oq=CN108680526A, last visit: Jun. 3, 2024]). (Year: 2018).*
KR102249398B1—Google English Translation (Year: 2021).*
Danese S. et al., Inflammatory bowel disease; the role of environmental factors. Autoimmun. Rev. 3: 394-400, 2004.
Philpott D.J. et al., Innate immune responses of epithelial cells following infection with bacterial pathogens. Curr. Opin. Immunol. 13: 410-416, 2001.
Fiocchi C., Inflammatory bowel disease; etiology and pathogenesis. Gastroenterology 115: 182-205, 1998.
Blumberg R.S. et al., Animal models of mucosal inflammation and their relation to human inflammatory bowel disease. Curr. Opin. Immunol. 11: 648-656, 1999.
Li Y., De Haar C. et al., Disease-related expression of the IL-6/STAT3/SOCS3 signaling pathway in ulcerative colitis and ulcerative colitis-related carcinogenesis. Gut. 59: 227-235, 2010.
Domenech E. Inflammatory bowel disease: current therapeutic options. Digestion 73: 67-76, 2006.
Sandborn W.J. et al., Biologic therapy of inflammatory bowel disease. Gastroenterology 122: 1592-1608, 2002.
Huang et al., Hot-water extract of ripened Pu-erh tea attenuates DSS-induced colitis through modulation of the NF-κB and HIF-1α signaling pathways in mice. Food Funct. 2020, vol. 11, pp. 3459-3470.

* cited by examiner

COMPOSITION FOR PREVENTING AND TREATING INFLAMMATORY BOWEL DISEASE INCLUDING PUER TEA EXTRACT

CROSS-REFERENCE TO RELATED APPLICATIONS

This application is based on and claims priority from Korean Patent Application No. 10-2021-0084841, filed on Jun. 29, 2021, with the Korean Intellectual Property Office, the disclosure of which is incorporated herein in its entirety by reference.

TECHNICAL FIELD

The present disclosure relates to a composition for preventing and treating inflammatory bowel disease, including puer tea extract as an active ingredient.

BACKGROUND

Puer tea is a representative microbial fermented tea produced from tea leaves of Camellia assamica var. kucha, C. kucha of Yunnan, China. Puer tea is popular because puer tea has the ability to break down fat, and thus is effective in preventing obesity. Puer is the name of a prefecture in Yunnan Province, China, and is a generic term for teas (green tea, black tea, and brick tea) produced here, but now post-fermented tea is representative thereof. Yunnan puer tea, which has a unique moldy odor, is considered one of the rarest teas in the world. 20% of people who use Chinese tea such as oolong tea are fond of drinking this tea. This post-fermentation reduces the astringency and bitterness in the tea leaves, and the brewed tea water is thickened and softened, making it easier to drink.

In particular, puer tea is a post-fermented tea in which microorganisms belonging to Aspergillus and Penicillium are propagated to make this tea fermented by enzymes secreted by these microorganisms. Puer tea is black or blackish-brown in color, shiny, and has a strong flavor and fragrance that lasts for a long time. It is recorded in the Chinese literature, Bencao Gangmu Shiyi, that puer tea is black as pitch darkness, has the effect of sobering up, digests food, removes phlegm, cleanses the stomach, and promotes the secretion of body fluids. In recent studies, various effects such as anti-obesity, antioxidant, cholesterol level control, cancer prevention, and bone health have been reported.

Puer tea is called post-fermented tea because it is made through fermentation by microorganisms in the air along with enzymes contained in tea leaves. It is one of the most consumed teas in the world recently. Puer tea contains various kinds of amino acids and saponins, so it is widely used for the prevention and treatment of adult diseases, and scientific research is being actively conducted.

Ulcerative colitis is a chronic inflammatory bowel disease in which inflammation or ulceration occurs from the rectum close to the anus, and the lesion gradually progresses to the entire large intestine. It is a common disease in Western countries where people mainly eat meat, such as Europe and the United States, and is recognized as a rare disease in Korea. However, recently, also in Korea, the incidence of ulcerative colitis is increasing due to the westernization of diet.

The main symptoms of ulcerative colitis are bloody diarrhea and abdominal pain, and in severe cases, ulcerative colitis is accompanied by stools containing blood and pus several times a day. Ulcerative colitis is a chronic disease in which patients complain of pain such as dehydration, anemia, fever, and weight loss, and that repeats remission and recurrence.

The etiology of ulcerative colitis is complex and diverse and is being studied continuously. In particular, although the cause and mechanism of the disease have not been specifically and clearly elucidated, it has been reported that various causes such as genetic factors, immune system disorders, smoking, or the intestinal environment caused by intestinal bacteria play a role. In addition, many studies on the role of inflammatory cytokines in ulcerative colitis lesions are ongoing, and excessive generation of inflammatory cytokines amplifies the pathological condition to induce sepsis and organ damage. In other words, it is estimated that the increase in the expression of inflammatory cytokines in the colonic tissue affects the differentiation and proliferation of immune cells and causes tissue damage. In particular, there is a report that the generation of inflammatory cytokines is significantly increased in patients with ulcerative colitis compared to normal people. Accordingly, a natural substance that inhibits the expression of inflammatory cytokines in ulcerative colitis tissue may suggest utility as an important substance for the treatment of ulcerative colitis.

It has been reported that excessive generation of reactive oxygen species (ROS) sustains inflammation in the colonic tissue, whereas the increase in antioxidant power reduces the chronic inflammatory response. Recently, it has been reported that EGCG (Epigallocatechin-3-gallate) and polyphenol, which have excellent antioxidant effects, are effective in inhibiting the inflammatory response in an ulcerative colitis experimental model. Currently used therapeutic agents for ulcerative colitis include aminosalicylate preparations such as sulfasalazine and mesalazine, and steroid preparations. When patients do not respond to steroid treatment, immunosuppressants such as azathioprine, 6-mercaptopurine, or cyclosporine are used.

Ulcerative colitis is a repeatedly recurring disease, and long-term drug administration may cause various side effects, from common side effects such as nausea, vomiting, indigestion, loss of appetite, and headache to severe side effects such as skin rash, fever, pancreatitis, hepatitis, hemolytic anemia, and bone marrow suppression due to hypersensitivity reactions. In addition, there are cases where resistance to the drug develops. When treatment is stopped due to side effects caused by long-term use of therapeutic agents, the condition worsens and the vicious cycle repeats.

Accordingly, there is an urgent need to develop a new therapeutic agent with high efficacy and safety for ulcerative colitis. Recently, interest in developing therapeutic agents utilizing natural substances with fewer side effects is increasing.

From a medical viewpoint, ulcerative colitis belongs to the categories of chronic indigestion, diarrhea, vomiting, dysentery, blood stools, and abdominal pain. There are a number of medicinal herbs that may be applied to these diseases. These medicinal herbs can be taken for a long time without putting too much strain on the human body. Accordingly, it is necessary to scientifically verify the therapeutic effect of these medicinal herbs on ulcerative colitis, and to develop an original drug through research and development in connection with basic studies.

In this regard, the present inventors tried to measure the effect of a puer tea extract on various clinical symptoms in a model of acute ulcerative colitis induced with dextran sulfate sodium (DSS) in order to identify the alleviation effect of puer tea on ulcerative colitis. In addition, in order to scientifically identify the antioxidant and anti-inflammatory effects of puer tea, the present disclosure howed various inflammatory factors regulating effects in a cell experimental model. In addition, the present disclosure suggests the possibility of utilizing puer tea as a functional substance for the treatment of colon and other inflammatory diseases.

RELATED ART DOCUMENTS

Non-Patent Documents (Non-Patent document 1)1) Danese S., Sans M., Fiocchi C. 2004. Inflammatory bowel disease; the role of environmental factors. Autoimmun Rev. 3: 394-400.
(Non-Patent document 2)2) Philpott D. J., Girardin S. E., Sansonetti P. J. 2001. Innate immune responses of epithelial cells following infection with bacterial pathogens-.Curr. Opin. Immunol. 13: 410-416.
(Non-Patent document 3)3) Fiocchi C. 1998. Inflammatory bowel disease; etiology and pathogenesis. Gastroenterology 115: 182-205.
(Non-Patent document 4)4) Blumberg R. S., Saubermann L. J., Strober. W. 1999. Animal models of mucosal inflammation and their relation to human inflammatory bowel disease. Curr. Opin. Immunol. 11: 648-656.
(Non-Patent document 5)5) Li Y., de Haar C., Chen M., Deuring J., Gerrits M. M., Smits R., Xia B., Kuipers E. J., van der Woude J. 2010. Disease-related expression of the IL-6/STAT3/SOCS3 signaling pathway in ulcerative colitis and ulcerative colitis-related carcinogenesis. Gut. 59: 227-235.
(Non-Patent document 6)6) Domenech E. 2006. Inflammatory bowel disease: current therapeutic options. Digestion 73: 67-76.
(Non-Patent document 7)7) Sandborn W. J., Targan S. R. 2002. Biologic therapy of inflammatory bowel disease. Gastroenterology 122: 1592-1608.

SUMMARY

An aspect of the present disclosure is directed to providing a food composition for preventing or alleviating inflammatory bowel disease, including puer tea extract as an active ingredient.

An aspect of the present disclosure is directed to providing a health functional food for preventing or alleviating inflammatory bowel disease, including puer tea extract as an active ingredient.

An aspect of the present disclosure is directed to providing a pharmaceutical composition for preventing or treating inflammatory bowel disease, including puer tea extract as an active ingredient.

An aspect of the present disclosure is directed to providing a feed composition for preventing or alleviating inflammatory bowel disease, including puer tea extract as an active ingredient.

An aspect of the present disclosure is directed to providing a method for preparing a food composition for preventing or alleviating inflammatory bowel disease.

An embodiment of the present disclosure provides a food composition for preventing or alleviating inflammatory bowel disease, including puer tea extract as an active ingredient.

An embodiment of the present disclosure provides a health functional food for preventing or alleviating inflammatory bowel disease, including puer tea extract as an active ingredient.

An embodiment of the present disclosure provides a pharmaceutical composition for preventing or treating inflammatory bowel disease, including puer tea extract as an active ingredient.

An embodiment of the present disclosure provides a feed composition for preventing or alleviating inflammatory bowel disease, including puer tea extract as an active ingredient.

An embodiment of the present disclosure provides a method for preparing a food composition for preventing or alleviating inflammatory bowel disease, in which the method includes:

a) pouring boiled water into puer tea leaves to brew and store puer tea;
b) indirectly heating the water to 98 to 100 degrees in the puer tea;
c) applying the puer tea obtained by repeating step a) to step b);
d) adding the puer tea of step c) to the puer tea of step b);
e) when a viscosity of the puer tea in step d) reaches a predetermined viscosity, pouring the puer tea into bamboo and drying the same at room temperature; and
f) hot-water extracting the dried puer tea from step e).

Puer tea extract according to the present disclosure showed an effect of improving damaged colonic tissue when administered with puer tea extract in a mouse model of acute ulcerative colitis induced by DSS, and showed an inhibitory effect on clinical symptoms of the disease activity index (DAI) of weight loss, diarrhea, and rectal bleeding. In addition, puer tea extract inhibited the expression of inflammatory cytokines TNF-α and IL-6 in the colonic tissue and inhibited the inflammatory response through inhibition of the activity of NF-κB, an anti-inflammatory mechanism. In addition, the DPPH free radical and ABTS free radical scavenging ability increased proportionally as the concentration of puer tea extract increased at the cellular level, and COX-2 expression was inhibited in LPS-activated macrophages. Accordingly, puer tea extract of the present disclosure can be usefully used as a food, health functional food, pharmaceutical, feed, anti-inflammatory and antioxidant composition capable of preventing and treating inflammatory bowel disease, in particular, ulcerative colitis.

DETAILED DESCRIPTION

Figure 1:
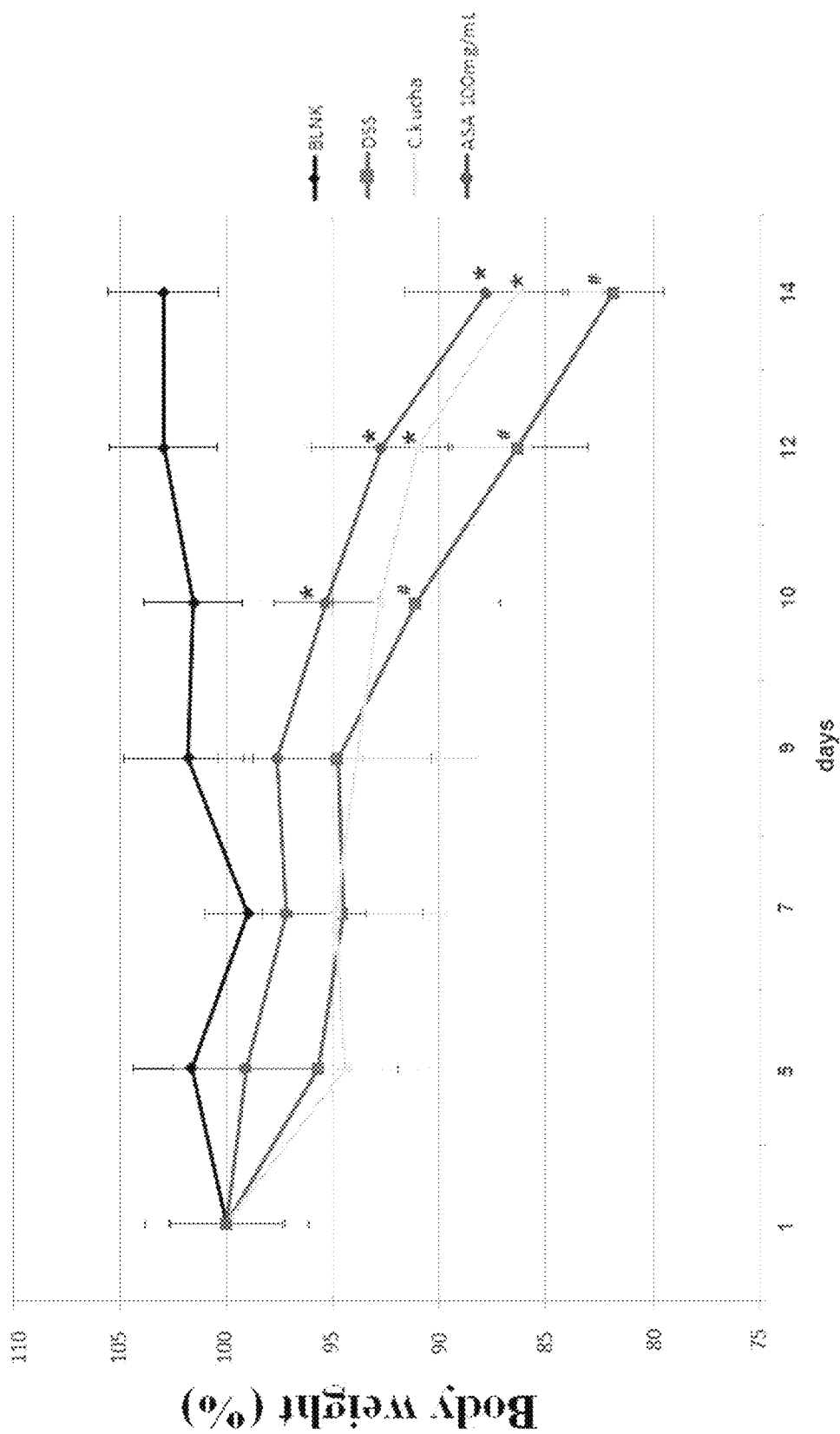
FIG. 1 is a diagram identifying that weight loss is significantly inhibited when puer tea extract is administered in an animal model of DSS-induced ulceration.

Hereinafter, the present disclosure will be described in detail by way of embodiments of the present disclosure with reference to the accompanying drawings. However, the following examples are provided by way of illustration of the present disclosure. When it is determined that the specific description of known techniques or configuration well known to those skilled in the art unnecessarily obscure the gist of the present disclosure, the detailed description therefor may be omitted, and the present disclosure is not limited thereto. The present disclosure allows various modifications and applications within the description of the claims to be described later and the scope of equivalents interpreted therefrom.

An embodiment of the present disclosure provides a food composition for preventing or alleviating inflammatory bowel disease, including puer tea extract as an active ingredient.

The puer tea is prepared from tea leaves of the tea tree (*Camellia assamica* var. *kucha*), but is not limited thereto, as long as it is for obtaining the puer tea extract of the present disclosure.

The puer tea may be extracted with any one solvent selected from the group consisting of water, C1 to C4 lower alcohols, or a mixed solvent thereof, and preferably ethanol may be used as extraction solvent, but is not limited thereto.

The puer tea may be a fractionation of puer tea extract with a solvent selected from the group consisting of hexane, chloroform, ethyl acetate, and butanol, but is not limited thereto.

The composition inhibits weight loss, colon shortening, diarrhea, and rectal bleeding, but is not limited thereto.

The composition inhibits an inflammatory response by inhibiting expression of inflammatory mediators and regulating NF-κB activity, but is not limited thereto.

The inflammatory mediators are, but are not limited to, inflammatory cytokines, NO, iNOS, COX-2, and $PGE_2$.

The inflammatory cytokines are, but are not limited to, TNF-α and IL-6.

The composition inhibits generation of active oxygen by scavenging DPPH and ABTS free radicals, but is not limited thereto.

The composition inhibits IκB degradation, but is not limited thereto.

The puer tea extract is characterized by being contained in a concentration of 0.01 mg/mL to 1 mg/mL, but is not limited thereto.

The inflammatory bowel disease is one selected from the group consisting of ulcerative colitis, Crohn's disease, intestinal Bechet's disease, hemorrhagic rectal ulcer, intestinal lesion, and pouchitis, but preferably may be ulcerative colitis, but is not limited thereto.

In addition to containing an active ingredient, the food composition of the present disclosure may contain various flavoring agents or natural carbohydrates as additional ingredients like a conventional food composition.

Examples of the above-mentioned natural carbohydrates include monosaccharides such as glucose and fructose; disaccharides such as maltose and sucrose; and polysaccharides such as conventional sugars such as dextrin and cyclodextrin, and sugar alcohols such as xylitol, sorbitol, and erythritol. The above-mentioned flavoring agents may advantageously use natural flavoring agents (thaumatin), stevia extract (for example, rebaudioside A, glycyrrhizin, etc.) and synthetic flavoring agents (saccharin, aspartame, etc.). The food composition of the present disclosure may be formulated in the same manner as the pharmaceutical composition and used as a functional food or added to various foods. Foods to which the composition of the present disclosure may be added include, for example, beverages, meat, chocolate, foods, confectionery, pizza, ramen, other noodles, gums, candy, ice cream, alcoholic beverages, vitamin complexes, and health supplements.

In addition, in addition to the extract as the active ingredients of the present disclosure, the food composition may contain various nutrients, vitamins, minerals (electrolytes), flavorings such as synthetic flavorings and natural flavorings, colorants and enhancers (cheese, chocolate, and the like), pectic acid and salts thereof, alginic acid and salts thereof, organic acids, protective colloid thickeners, pH adjusting agents, stabilizers, preservatives, glycerin, alcohols, and carbonating agents used in carbonated beverages. In addition, the food composition of the present disclosure may contain natural fruit juice and flesh for the production of fruit juice drinks and vegetable drinks.

The functional food composition of the present disclosure may be manufactured and processed in the form of tablets, capsules, powders, granules, liquids, pills, and the like. In the present disclosure, the term "health functional food composition" refers to food manufactured and processed using ingredients or components having functional properties useful for the human body according to Act No. 6727 of the Health Functional Food, and means ingestion for the purpose of obtaining useful effects for health purposes such as controlling nutrients or physiological effects on the structure and function of the human body. The health functional food may include conventional food additives and its suitability as a food additive is determined by the standards for the relevant item in accordance with General Regulations and General Test Methods of Korean Food Additives Codex approved by the Ministry of Food and Drug Safety, unless otherwise specified. Examples of the items published in the above-mentioned "Korean Food Additives Codex" include chemical synthetics such as ketones, glycine, potassium citrate, nicotinic acid, and cinnamic acid, natural additives such as persimmon extract, licorice extract, crystalline cellulose, kaoliang color, and guar gum, mixed preparations such as L-sodiumglutamate preparation, alkaline agents for noodles, preservative formulation and a tar color formulation. For example, the health functional food in the form of tablets may be granulated by a conventional method with a mixture of the active ingredients of the present disclosure with an excipient, binder, disintegrant, and other additives, followed by compression molding by putting a lubricant, etc. or direct compression molding of the mixture. In addition, the health functional food in the form of tablets may contain corrigents, or the like, if necessary. Among health functional foods in the form of capsules, hard capsules may be prepared by filling a mixture of the active ingredients of the present disclosure with additives such as excipients in a conventional hard capsule, and soft capsules may be prepared by filling a mixture of the active ingredients of the present disclosure with additives such as an excipient in a capsule base such as gelatin. The soft capsules may contain a plasticizer such as glycerin or sorbitol, a colorant, a preservative, and the like, if necessary. The health functional food in the form of pills may be prepared by molding a mixture of the active ingredients of the present disclosure with an excipient, a binder, a disintegrant, etc. by a conventionally known method, and if necessary, it may be coated with white sugar or other coating agents. Alternatively, the surface may be coated with a material such as starch or talc. The health functional food in the form of granules may be prepared in granular form by a conventionally known method with a mixture of the active ingredients of the present disclosure with an excipient, binder, disintegrant, and the like. If necessary, it may contain fragrance ingredients, corrigents, and the like.

An embodiment of the present disclosure provides a composition for preventing and treating inflammatory bowel disease, including puer tea extract as an active ingredient.

In the present disclosure, the term "prevention" refers to all actions for inhibiting or delaying the outbreak of inflammatory bowel disease and complications resulting therefrom by administration of the pharmaceutical composition according to the present disclosure.

The term "treatment" used herein refers to all actions in which the symptoms of an inflammatory bowel disease suspected and an onset subject are alleviated or beneficially changed by administration of the pharmaceutical composition. Those skilled in the art can appreciate the exact criteria of the disease on which the compositions herein have effects and determine the extent of improvement, enhancement, and treatment with reference to the data presented by the Korean Academy of Medical Sciences, etc.

The pharmaceutical composition of the present disclosure may further include an adjuvant in addition to an active ingredient. The adjuvant may be used without limitation as long as it is known in the pertinent technical field. For example, it may further include Freund's complete adjuvant or incomplete adjuvant to increase immunity.

The pharmaceutical composition according to the present disclosure may be produced in the form of incorporation of an active ingredient into a pharmaceutically acceptable carrier. In this regard, the pharmaceutically acceptable carrier includes a carrier, excipient and diluent commonly used in the pharmaceutical field. Pharmaceutically acceptable carriers for use in the pharmaceutical compositions of the present disclosure include, but are not limited to, lactose, dextrose, sucrose, sorbitol, mannitol, xylitol, erythritol, maltitol, starch, acacia rubber, alginate, gelatin, calcium phosphate, calcium silicate, cellulose, methylcellulose, polyvinylpyrrolidone, water, methyl hydroxybenzoate, propyl hydroxybenzoate, talc, magnesium stearate, and mineral oil.

The pharmaceutical composition of the present disclosure may be formulated and used in oral formulations such as powders, granules, tablets, capsules, suspensions, emulsions, syrups, and aerosols, external preparations, suppositories, or sterile injection solutions according to conventional methods, respectively.

Formulations may be prepared by using generally used excipients or diluents such as fillers, extenders, binders, wetting agents, disintegrating agents, and surfactant. Solid formulations for oral administration include tablets, pills, powders, granules, and capsules. These solid formulations are prepared by mixing one or more excipients such as starch, calcium carbonate, sucrose, lactose, and gelatin to active ingredients. Except for the simple excipients, lubricants, for example magnesium stearate, and talc may be used. Liquid formulations for oral administrations include suspensions, solutions, emulsions and syrups, and the above-mentioned formulations may contain various excipients such as wetting agents, sweeteners, aromatics, and preservatives in addition to generally used diluents such as water and liquid paraffin. Formulations for parenteral administration include sterilized aqueous solutions, water-insoluble excipients, suspensions, emulsions, lyophilized preparations, and suppositories. Water-insoluble excipients and suspensions may include propylene glycol, polyethylene glycol, vegetable oil such as olive oil, injectable ester such as ethylolate, etc. The base material of suppositories may include witepsol, tween 61, cacao butter, laurin butter, glycerogelatin, etc.

The pharmaceutical composition according to the present disclosure may be administered to a subject by various routes. Administration may be carried out by any of the predictable methods, for example, oral, intravenous, intramuscular, subcutaneous, and intraperitoneal injections.

Taking into account the age, body weight, gender, and physical condition of a subject, a dose of the pharmaceutical composition according to the present disclosure is selected. It is obvious that the concentration of an active ingredient included in the pharmaceutical composition may be variously selected depending on a subject, and is preferably included in the pharmaceutical composition at a concentration of 0.01 to 5,000 μg/ml. When the concentration is less than 0.01 μg/ml, pharmaceutical activity may not appear, and when the concentration exceeds 5,000 μg/ml, it may be toxic to the human body.

The pharmaceutical composition may be formulated in various oral or parenteral formulations.

Formulations for oral administration include, for example, tablets, pills, hard and soft capsules, liquids, suspensions, emulsifiers, syrups, and granules. These formulations may further include diluent (for example: lactose, dextrose, sucrose, mannitol, sorbitol, cellulose, and/or glycine) and glydents (for example: silica, talc, and stearic acid and its magnesium or calcium salts, and/or polyethylene glycol) in addition to the active ingredients. In addition, the tablets may contain binding agents such as magnesium aluminum silicate, starch paste, gelatin, tragacanthin, methyl cellulose, sodium carboxymethyl cellulose, and/or polyvinyl pyrrolidine, and depending on the situation, may contain disintegration agent such as starch, agar, alginic acid or its sodium salt or boiling mixture and/or absorbent, colorant, flavoring, and sweetener. The formulations may be produced by general mixing, granulation, or coating methods.

In addition, the representative formulations for parenteral administration are injection formulations, and water, Ringer's solution, isotonic saline, or suspension may be exemplified as a solvent for the injection formulation. Sterilized fixation oil of the injection formulation may be used as solvent or suspension medium, and any non-irritating fixation oil including mono- and di-glyceride may be used for such purpose.

In addition, the injection formulation may use fatty acids such as oleic acid.

In an aspect, the present invention relates to the method for treating inflammatory bowel disease, in which the method includes administering the extract and a pharmaceutically acceptable salt thereof to a subject having inflammatory bowel disease in a pharmaceutically effective amount.

An embodiment of the present disclosure provides a feed composition for preventing or alleviating inflammatory bowel disease, including puer tea extract as an active ingredient.

The feed composition of the present disclosure has an effect of replacing existing antibiotics, inhibiting the growth of harmful pathogenic food bacteria to improve the health state of an animal, and prevent and alleviate inflammatory bowel disease due to antioxidant and anti-inflammatory effects. The feed composition of the present disclosure may be produced in the form of fermented feed, mixed feed, pellets, silage, or the like. The fermented feed may be produced by adding various microbes or enzymes other than the peptide of the present disclosure to ferment organic matters, and the mixed feed may be produced by admixing the peptide of the present disclosure with various kinds of common feed. Feed in a pellet form may be produced by applying heat and pressure to the mixed feed in a pelletizing machine, and silage may be produced by fermenting green fodder with the microbes of the present disclosure. Fermented wet feed may be produced by, after collecting and transporting organic matters and admixing the same with an excipient at a certain ratio for moisture control and sterilization, fermenting organic matters like food waste at a temperature suitable for fermentation for 24 hours or longer to adjust moisture content to about 70%. Fermented dry feed may be produced according to adjustment of the moisture content to 30% to 40% or so by providing fermented wet feed additionally to a drying process.

The feed composition of the present disclosure may further include an ingredient added to a conventional feed. Examples of the ingredients added to the feed may include grain powder, meat powder, beans, and the like. In the above, the grain powder may be one or more selected from the group consisting of rice flour, wheat flour, barley flour, and corn flour. In the above, the meat powder may be meat powder obtained by pulverizing any one or more selected from the group consisting of chicken, beef, pork, and ostrich meat. In the above, as the beans, one or more selected from the group consisting of soybeans, kidney beans, peas, and black beans may be used.

In the feed composition of the present disclosure, any one or more selected from the group consisting of nutrients and minerals may be added in addition to the above-mentioned ingredients added to conventional feed, such as grain powder, meat powder, and beans, to increase the nutritional value of the feed, and at least one selected from the group consisting of an antifungal agent, an antioxidant, an anticoagulant, an emulsifier, and a binder may be included in order to prevent the deterioration of feed quality.

A method for preparing puer tea according to a preparation example of the present disclosure includes a method for preparing a food composition for preventing or alleviating inflammatory bowel disease, in which the method includes:
  a) pouring boiled water into puer tea leaves to brew and store puer tea;
  b) indirectly heating the water to 98 to 100 degrees in the puer tea;
  c) applying the puer tea obtained by repeating step a) to step b);
  d) adding the puer tea of step c) to the puer tea of step b);
  e) when a viscosity of the puer tea in step d) reaches a predetermined viscosity, pouring the puer tea into bamboo and drying the same at room temperature; and
  f) hot-water extracting the dried puer tea from step e), but is not limited thereto.

In general, puer tea cream is prepared in an alpine region where puer tea leaves are collected. However, in the present disclosure, there is provided a method for preparing puer tea cream capable of reducing a preparation time by accelerating the evaporation of water in an environment such as an alpine region to shorten a drying period.

Hereinafter, the present disclosure will be described in more detail by way of preparation examples and examples. These examples are merely for illustrating the present disclosure in more detail, and it will be apparent to those skilled in the art that the scope of the present disclosure is not limited to these examples.

Preparation Example 1

Preparation Method of Puer Tea Extract
Step a)

Step a) above is a step of brewing puer tea by putting puer tea leaves in a kettle and pouring boiling water in a copper kettle. Here, the silver kettle is a kettle made of a silver material, and due to the characteristics of the silver material, when puer tea is made with a silver kettle, the destruction of trace elements dissolved in water is small, so that the unique taste of tea may be kept. Puer tea is made by pouring the water boiled in this silver kettle into a silver kettle and putting puer tea leaves into the silver kettle. In addition, the copper kettle is a kettle made of a copper material, and due to the characteristics of the copper material, it is excellent in heat retention because it does not cool quickly. This copper kettle is used to boil water for making puer tea to be put into a silver pipkin. About 10 kg of puer tea leaves to be put in the silver kettle is suitable. The puer tea leaves are extracted from young shoots from the puer tea tree in an alpine region at an altitude of 1600 m above sea level.

Step b)

Step b) above is a step of storing the puer tea brewed in step a) in the silver teapot. Here, the silver teapot is a bowl made of a silver material. When puer tea is made in a silver kettle, it is poured into the silver teapot and stored. Puer tea stored in the silver teapot is supplied to the silver pipkin in fixed quantity for 6 days.

Step c)

Step c) above is a step of putting cold water, puer tea and other tea leaves in a copper pot. Here, the copper pot means a pot made of a copper material. In this copper pot, water to boil and tea leaves are put. Here, the tea leaves that are put into the copper pot are not tea leaves for making puer tea cream. In addition, the lower part of the copper pot is directly heated by lighting a fire.

Step d)

Step d) above is a step of putting a silver pipkin on the water in a copper pot, pouring puer tea stored in the silver teapot into the silver pipkin, and then covering the upper part of the silver pipkin with at least one Korean paper. Here, the at least one Korean paper is formed by overlapping each of the Korean papers coated with sesame oil. In addition, the silver pipkin means to a pot made of a silver material, and is a bowl for making puer tea cream. This silver pipkin is provided inside the copper pot filled with water so that it is indirectly heated by boiling water in the copper pot, so that it is not heated by direct fire, and thus burning is prevented. In addition, inside the silver pipkin, the puer tea stored in the silver teapot is continuously put in a fixed amount for 6 days. The reason for heating the silver pipkin floating on the water in the copper pot is to prevent burning because the silver pipkin is indirectly heated. In addition, the at least one Korean paper is a cover made by applying sesame oil on Korean paper and overlapping 7 sheets of paper, so that moisture inside the silver pipkin is smoothly discharged to the outside and foreign substances such as external dust are not introduced into the silver pipkin. Thus, even when it rains, moisture may not flow into the silver pipkin. In addition, the reason why tea cream is poured into the inner surface of bamboo shoot leaves and then is dried is that the cuticle layer is covered on the inner side of the bamboo shoot leaves, and when the tea cream is poured on such a smooth surface and dried in the sun for 7 days, it is dried with the bamboo shoot leaves so that the candied tea cream may be separated naturally.

Step e)

Step e) above is a step of indirectly heating the silver pipkin by heating the water in the copper pot to 98° C. to 100° C. for a first period. The first period may be 7 days to 8 days. More preferably, 7 days is suitable for the first period.

Step f)

Step f) above repeats steps a) and b) to replenish the puer tea stored in the silver teapot by a certain amount in the silver pipkin every first cycle for a second period. The second period may be 6 to 7 days shorter than the first period in step e) above. More preferably, 6 days is suitable for the second period. In addition, the first cycle may be 20 to 30 hours. More preferably, 24 hours is suitable for the first cycle.

Step g)

Step g) above is a step of pouring puer tea into the inner surface of bamboo shoot leaves and drying at room temperature when the viscosity of the puer tea indirectly heated in the silver pipkin reaches a predetermined viscosity. The predetermined viscosity may be 30000 to 38000 cP (centipoise). It is preferable that the predetermined viscosity has a thick viscosity similar to that of conventional taffy. Puer tea with a predetermined viscosity as such was brewed tea water at first, but as time goes by, a lump of dark green is produced with bubbles, and it becomes a dark, thick broth again, and then puer tea cream hardened into a black light shining like lacquer is produced. In other words, puer tea having a predetermined viscosity is poured onto the inner surface of the bamboo shoot leaves to a certain area and dried at room temperature to form puer tea cream. For example, puer tea is poured into the inner surface of the bamboo shoot leaves and dried in a high temperature and dry environment during the day, and is stored indoors at night and undergoes a drying process. The puer tea cream manufactured in this way may be cut to a predetermined size and packaged in capsules.

The puer tea extract of the present disclosure was obtained by hot water extraction of the puer tea cream prepared in the above steps.

Example 1. Experimental Materials, Methods, and Preparation

Example 1-1) Experimental Animals and Reagents

Experimental animals, ICR mice (6 weeks old male) were supplied from Daehan Biolink (Chungcheongbuk-do Province, Korea) and used. After 1 week of adaptation of experimental animals, 7 animals were accommodated in each group. During the experiment, the breeding conditions were 23±2° C. for a temperature, 55±10% for a relative humidity, and 150 to 300 Lux for lighting with a 12-hour cycle (artificial lighting, 8:00 am-8:00 pm). Feed was powdered feed for laboratory animals, and water was provided freely during the experiment period.

DSS was purchased from MP Biomedical (Soloon, OH, USA). Cytokine (TNF-α and IL-6) assay kit was purchased from BD Pharmingen (Sandiego, CA, USA) and $PGE_2$ assay kit was purchased from Stressgen Biotechnologies (San Diego, California, USA). COX-2, NF-κB, and b-actin Ab were purchased from Santa Cruz Biotechnology (Santa Cruz, CA, USA), and 1,1-diphenyl-2-picrylhydrazyl radical (DPPH), Folin-Denis, and other reagents were purchased from Sigma Co. (St. Louis, MO, USA).

Example 1-2) DPPH Radical Scavenging Activity Measurement

To measure DPPH radical scavenging activity, 0.1 mL of DPPH solution dissolved in ethanol was mixed with 0.1 mL of puer tea extract of various concentrations, reacted at 37° C. for 30 minutes, and then absorbance was measured at 520 nm with an ELISA leader. The control group was used by adding ethanol instead of the sample solution.

Example 1-3) ABTS Radical Scavenging Activity Measurement

For ABTS scavenging activity, after formation of ABTS cation radical ($ABTS^-$), the absorbance value was diluted to 0.75±0.002, and 1 mL of ABTS solution was mixed with 3 mL of the sample solution, followed by reaction, and then absorbance was measured at 734 nm. The free radical scavenging rate was calculated according to the following equation.

$$\text{Inhibition Rate (\%)} = \left(1 - \frac{\text{Absorbance of experimental group}}{\text{Absorbance of control group}}\right) \times 100$$

Example 1-4) DSS-Induced Ulcerative Colitis Model

Acute ulcerative colitis was induced in mice while allowing free intake of water containing 3% (w/v) of DDS for 14 days. During the experiment, each group of experimental animals was observed by checking whether the mice lost weight, urine and feces tests, and bleeding every day. Experimental animals were classified into the following four groups and the experiment was performed (Table 1). Puer tea extract and ASA were orally administered once a day for 14 days from the day of DDS treatment. After the experiment, mice were sacrificed, and the results were measured.

| Classification of Experimental Groups | |
|---|---|
| Group | Treatment |
| Group 1 | Control (saline) |
| Group 2 | DSS + Saline |
| Group 3 | DSS + C. kucha 100 mg/kg |
| Group 4 | DSS + 5-ASA (5-acetylsalicylic acid) 100 mg/kg |

Example 1-5) Disease Activity Index (DAI) Measurement

Ulcerative colitis is measured by clinical signs such as weight loss, diarrhea with bleeding and mucus, and shortens the length of the colon. Previous studies have shown that the DAI has three major clinical signs: weight loss, diarrhea, and rectal bleeding. Weight loss is calculated as the difference between the initial and present weight. Visible rectal bleeding means diarrhea accompanied by bleeding or total rectal bleeding, and the DAI was calculated by the following equation.

DAI=weight loss score+diarrhea score+rectal bleeding score

The medical variables used in the above equation are comprehensive functional measures similar to the medical symptoms that occur in ulcerative colitis lesions in the human body.

Example 1-6) Histological Observation

The large intestine of the experimental animal was removed, put in a 10% neutral formalin solution (NBF, natural buffered formalin), and fixed. Then, for histological evaluation, paraffin tissue samples were prepared, and each tissue sample was sectioned to a thickness of 4 µm. For histological examination, each sample was stained with hematoxylin & eosin and observed using an optical microscope.

Example 1-7) Cell Culture

Macrophage Raw 267.4 cells were cultured in a DMEM medium containing 10% FBS, 100 IU/ml of penicillin, and 50 µg/ml of streptomycin at 37° C. and 5.0% $CO_2$ conditions.

Example 1-8) Cell Viability Measurement: MTT Assay

Cell viability was measured using the principle of forming formazan by succinate dehydronase, a mitochondrial dehydrogenase of cells. Cells were aliquoted in a 96-well plate at $3 \times 10^5$ cells/well, pre-treated with puer tea extract (0.01, 0.1, 0.5 mg/mL) of various concentrations, and then 1 µg/ml of LPS was added and cultured for 24 hours. Then, 30 µL of MTT (5 mg/ml) solution was added to dissolve formazan produced in an organic solvent (DMSO). The amount of produced formazan was measured for absorbance at 540 nm using a microplate reader (Model 550, Bio-rad, USA). Cell proliferative capacity was calculated by the following equation.

$$\text{Cytotoxicity (\%)} = \left\{ \frac{\text{Absorbance of sample group}}{\text{Absorbance of control group}} \right\} \times 100$$

Example 1-9) $PGE_2$ Measurement

Cells were aliquoted to $3 \times 10^5$ cells/well in a 24-well plate, and then treated with puer tea extract and LPS (1 µg/mL) at various concentrations (0.01, 0.1, 0.5 mg/mL) and then cultured for 24 hours. The amount of $PGE_2$ contained in the culture medium was measured for absorbance at 450 nm using a commercial competitive enzyme immunoassay kit.

Example 1-10) NO Measurement

Cells were aliquoted to $3 \times 10^5$ cells/well in a 24-well plate, and then treated with puer tea extract and LPS (1 ug/mL) at various concentrations (0.01, 0.1, 0.5 mg/mL) and then cultured for 24 hours. The amount of NO contained in the culture medium was measured using the Griess Reagent System. The NO concentration was calculated using a standard curve for each concentration of $NaNO_2$.

Example 1-11) Nuclear Protein Isolation

To analyze the degree of activation of NF-κB, nuclear proteins were isolated from cells using the NE-PERTM Nuclear & Cytoplasmic Extraction Kit (Thermo Scientific, IL, USA).

Example 1-12) Enzyme-Linked Immunosorbent (ELISA) Assay

To measure the change in the expression of inflammatory cytokines in the colonic tissue, after the experiment was completed, the colonic tissue was removed, the tissue protein was isolated, and the enzyme immunosorbent assay was applied for measurement. In brief summary, in 96 well plates, 100 µl of primary antibody (1 µg/ml) was aliquoted into each well, followed by reaction overnight and coating. Thereafter, the unbound primary antibody was removed with PBS (PBST) containing 0.05% of Tween 20, and the sample was added and reacted at 37° C. for 2 hours. A secondary antibody diluted to 0.2 µg/ml was added and reacted for 2 hours. After removing the unbound secondary antibody with PBST, the enzyme avidin-peroxidase and the substrate 2,2'-azino-bis-(3-ethyllbenzthiazoline-6-sulfonic acid) were added to measure the absorbance at 450 nm. Protein quantification of colonic tissue was measured using a bicinchoninic acid protein assay reagent.

Example 1-13) Western Blot Assay

After the experiment was completed, the colonic tissue was washed twice with ice-cold PBS and lysed with ice-cold protein extraction solution (Intron Biotechnology, Sungnam, Korea). Lysate was centrifuged at 15,000 rpm, 4° C., for 15 minutes, and the supernatant was used as a sample. Thereafter, the same amount was mixed with 2×SDS sample buffer (Elpis Biotech, Daejeon, Korea), and heated at 95° C. for 5 minutes. The prepared sample was electrophoresed with 10% SDS-PAGE gels and then transferred to nylon membranes by electrophoretic transfer. Thereafter, the sample was blocked in 5% skim milk for 2 hours and reacted with primary antibodies at 4° C. overnight. After washing the membranes 4 times with PBST, the membranes were reacted with HRP-conjugated secondary antibodies for 1 hour. After washing the same with PBST, Western Lightning® Plus ECL solution was treated on PVDF membrane, and protein expression level was measured.

Example 1-14) Statistical Analysis

The experimental results of this study were expressed as mean±standard deviation (S.D.), and statistical analysis of each data was tested by t-test and a Tukey post hoc test of ANOVA. When $P<0.05$, it was determined significant.

Example 2. Improvement Effect of Puer Tea Extract on Weight Loss in DSS-Induced Ulcerative Colitis Model To measure the improvement effect of puer tea extract on ulcerative colitis in an animal model induced by DSS, the effect of puer tea extract on body weight change was measured. In this study, 5-ASA, a colitis therapeutic agent, was compared and experimented as a positive control group.

Puer tea extract (100 mg/kg) was orally administered once a day to 7 mice induced with 3% DSS for 14 days, and then the weights of the mice were measured, and the mean of the data in the triplicate experiment was expressed as ±S.D. ($\#p<0.05$ vs. control, $*p<0.05$ vs. DSS alone).

As a result of the experiment, weight loss was observed in the DSS single treatment group (3% DSS, 14 days of administration) compared to the normal group, and in particular, it decreased significantly after 10 days. However, it was identified that DSS-induced weight loss was significantly inhibited in the group administered with puer tea extract, and in particular, the improvement effect was identified in a similar manner to that of the positive control group (ASA) (FIG. 1).

Example 3. Improvement Effect of Puer Tea Extract on Colon Shortening in DSS-Induced Ulcerative Colitis Model It has been reported that changes in intestinal length in ulcerative colitis disease are associated with inflammatory progression. In this study, the effect of puer tea extract on colon shortening in an animal model of DSS-induced ulcerative colitis was measured.

Figure 2:
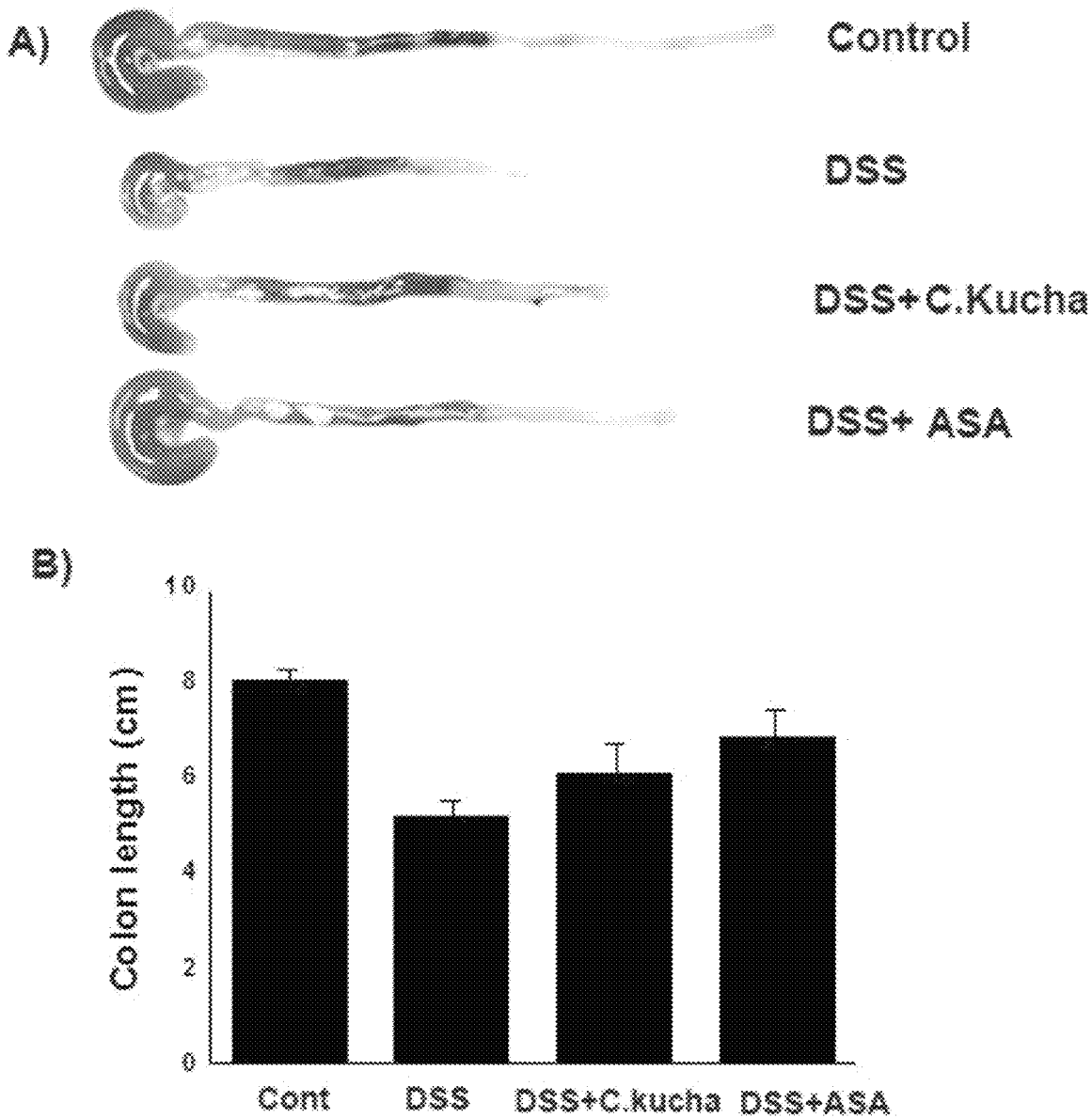
FIG. 2 is a diagram illustrating the evaluation of colon lengths by removing the colon after administration of puer tea extract in an ulcerative animal model induced by DSS to a positive control group (5-ASA) and a control group, respectively (A), and is a diagram illustrating the relative colon lengths (B).

Puer tea extract (100 mg/kg) was orally administered once a day for 14 days to 7 mice induced with 3% DSS for 14 days, and then the colon was removed, and the colon length was evaluated (A of FIG. 2). In addition, 5-ASA (100 mg/kg) with relative colon lengths indicated was used as a positive control group (B of FIG. 2), and the mean of the data in the triplicate experiment was expressed as S.D. ($\#p<0.05$ vs. control, $*p<0.05$ vs. DSS alone).

As a result of the experiment, the colon length of the normal group was measured to be 8.01±0.16 cm, whereas that of the DSS-administered group was 5.25±0.12 cm, which indicates that the colon length was significantly shorter than that of the normal group. However, in the puer tea extract and 5-ASA-treated groups, it was identified that the DSS-induced colon shortening was significantly inhibited by the puer tea extract, at 6.22±0.37 cm and 6.77±0.33 cm, respectively (FIG. 2).

Example 4. Improvement Effect of Puer Tea Extract on Damaged Colonic Tissues in DSS-Induced Ulcerative Colitis Model To measure the effect of puer tea extract on colonic tissue recovery in DSS-induced ulcerative colitis model, colonic tissues were analyzed for tissue lesions after H&E staining.

Figure 3:
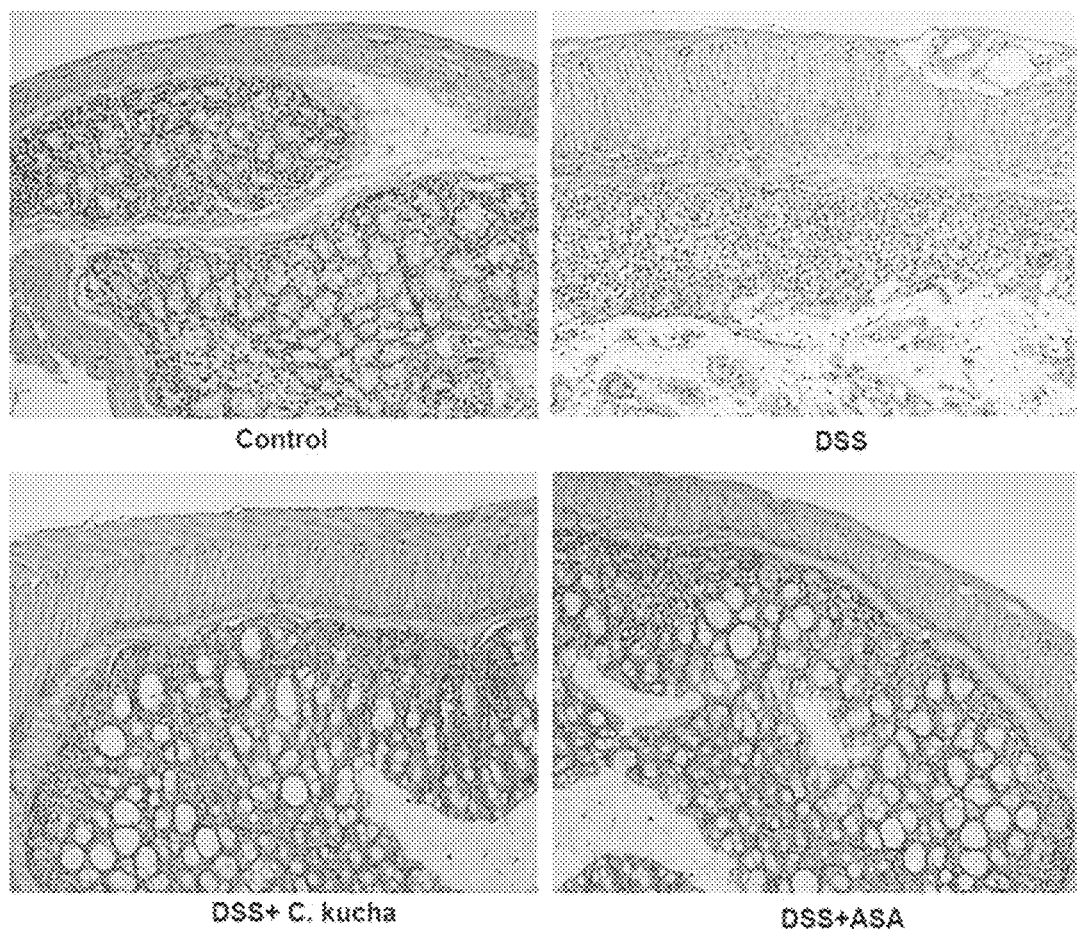
FIG. 3 is a diagram illustrating the microscopic observation of the tissue after administration of puer tea extract in an ulcerative animal model induced by DSS to a positive control group (5-ASA) and a control group, respectively, and staining with hematoxylin & eosin (A), and is a diagram evaluating the muscle thickness of colon fragments (B).
Figure 3:
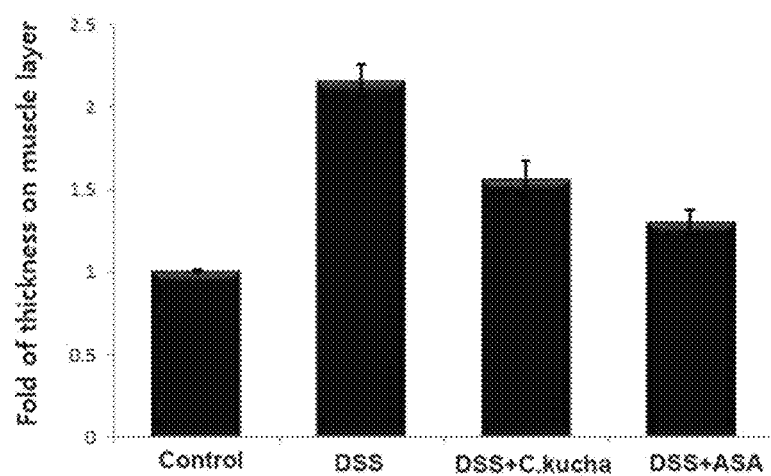

A representative part of colorectal tissues of mice administered with 3% DSS in drinking water for 14 days, regardless of the presence of puer tea extract of mice with DSS-induced colitis, was stained with H & E to examine the tissues under a microscope (A of FIG. 3), and the muscle thickness of the colorectal section was evaluated (B of FIG. 3).

Visually, it was identified that the thickness of the barrier muscle layer was thicker in the DSS group compared to the control group, and it was identified that the thickness of the barrier muscle layer became thinner again in the puer tea extract group and the 5-ASA group (FIG. 3).

Example 5. Improvement Effect of Puer Tea Extract on DAI in DSS-induced Ulcerative Colitis Model The DAI is measured by weight loss, diarrhea, and rectal bleeding, which are typical clinical symptoms, and is similar to the clinical symptoms of human acute ulcerative colitis also in an animal model of DSS-induced ulcerative colitis. In this experiment, to experiment the improvement effect of puer tea extract on ulcerative colitis, the effect of puer tea extract on DSS-induced DAI was measured.

Experimental colitis mice were induced by 3% DSS and administered with puer tea extract once a day for 14 days. DAI was calculated as in Examples 1-5), and the mean of the experimental data was expressed as ±SD. ($\#p<0.05$ vs. control, $*p<0.05$ vs. DSS alone).

Figure 4:
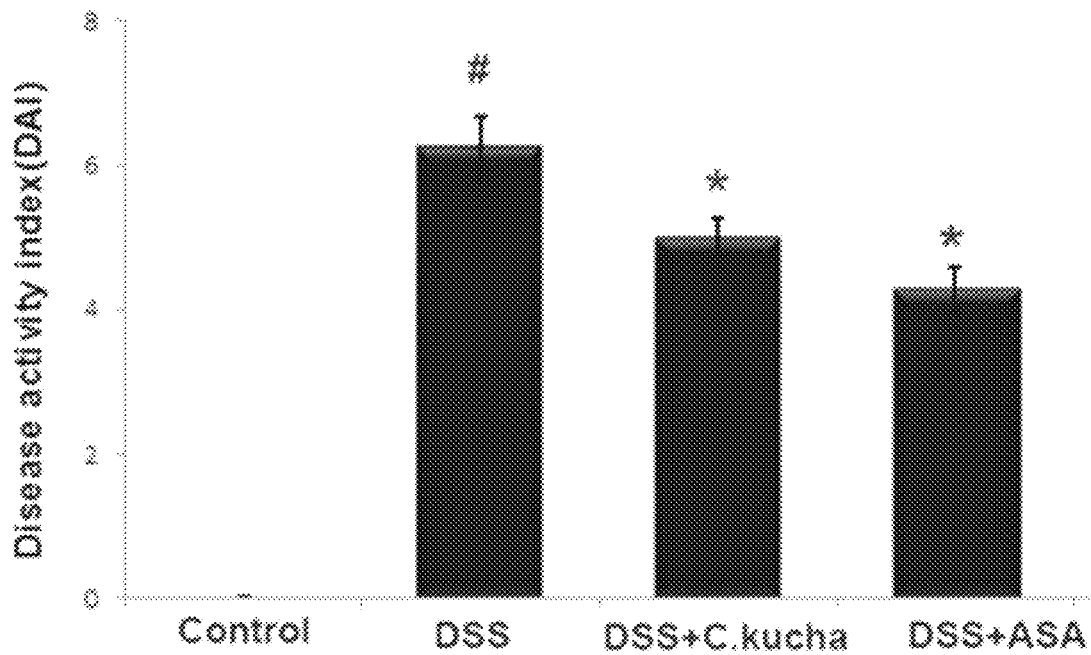
FIG. 4 is a diagram illustrating the DAI after administration of puer tea extract in an ulcerative animal model induced by DSS to a positive control group (5-ASA) and a control group, respectively.

As a result of the experiment, disease activation including clinical symptoms such as weight loss, diarrhea, and rectal bleeding increased in the DSS single treatment group compared to the normal group. However, it was identified that these changed clinical symptoms were significantly decreased in the puer tea extract and 5-ASA treatment groups. In particular, puer tea extract showed an effect similar to 5-ASA used as a positive control group (FIG. 4).

Example 6. Inhibitory Effect of Puer Tea Extract on Increase in TNF-α Expression in DSS-Induced Ulcerative Colonic Tissue According to the study result that the increase in the expression of inflammatory cytokines is highly associated with the occurrence of colitis, in this experiment, the effect of puer tea extract on the expression of TNF-α in the colonic tissue induced by DSS was measured.

Experimental colitis mice were induced by 3% DSS and administered with puer tea extract (100 mg/kg) once a day for 14 days. Thereafter, colorectal tissues were excised, and homogenized, and TNF-α levels of colitis tissues were quantified by ELISA. The means of all data of three independent experiments were expressed as ±SD. ($\#p<0.05$ vs. control, $*p<0.05$ vs. DSS alone).

Figure 5:
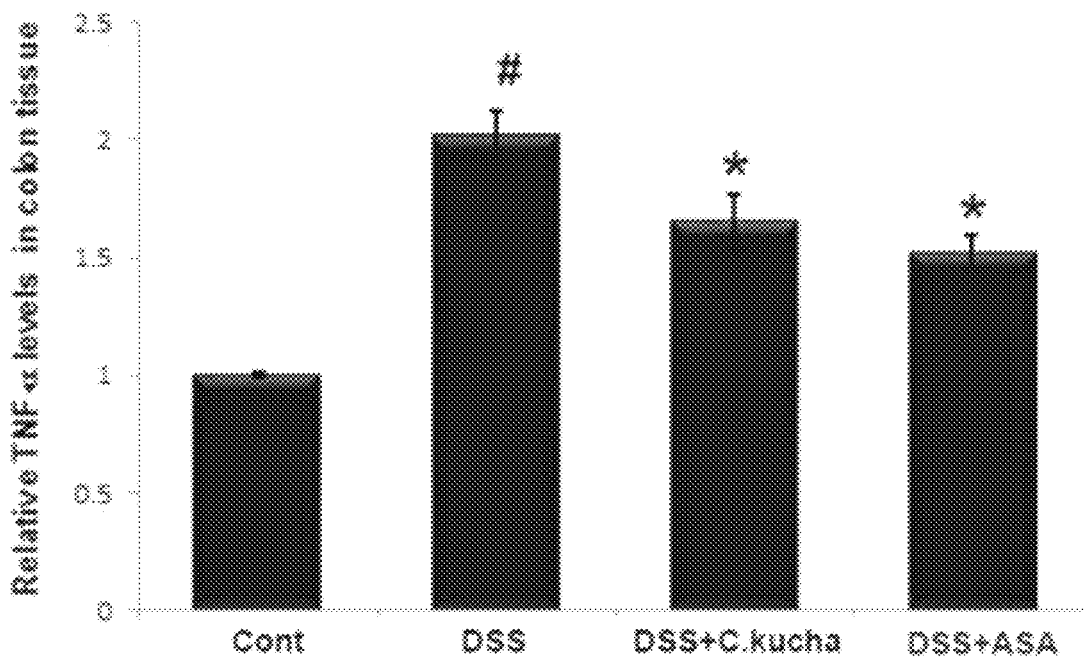
FIG. 5 is a diagram illustrating the TNF-α level of colitis tissue quantified by ELISA after administration of puer tea extract in an ulcerative animal model induced by DSS to a positive control group (5-ASA) and a control group, respectively.

After pulverizing the colonic tissue, the amount of change in TNF-α in the colonic tissue for each group was measured by an ELSIA method. As shown in FIG. 5, the expression level of TNF-α in the colonic tissue of the DSS single administration group was significantly higher than that of the colonic tissue of the normal group. However, it was identified that the TNF-α level in the colonic tissue was significantly decreased in the puer tea extract group than in the DSS single administration group. In particular, the TNF-α inhibition rate of puer tea extract was approximately 35.9%, which exhibited a similar effect to 5-ASA, a positive control group (FIG. 5).

Example 7. Inhibitory Effect of Puer Tea Extract on Increase in IL-6 Expression in DSS-Induced Ulcerative Colonic Tissue To measure the anti-inflammatory effect of puer tea extract in an animal model of ulcerative colitis, the amount of change in the inflammatory cytokine IL-6 in the colonic tissue was measured by an ELSIA method.

Experimental mouse models were induced with 3% DSS for 14 days. At the end of the experiment, colorectal tissue was excised and homogenized, and the level of IL-6 in colitis tissue was quantified by ELISA. The means of all data of three independent experiments were expressed as ±SD. ($^{\#}$p<0.05 vs. control, *p<0.05 vs. DSS alone).

Figure 6:
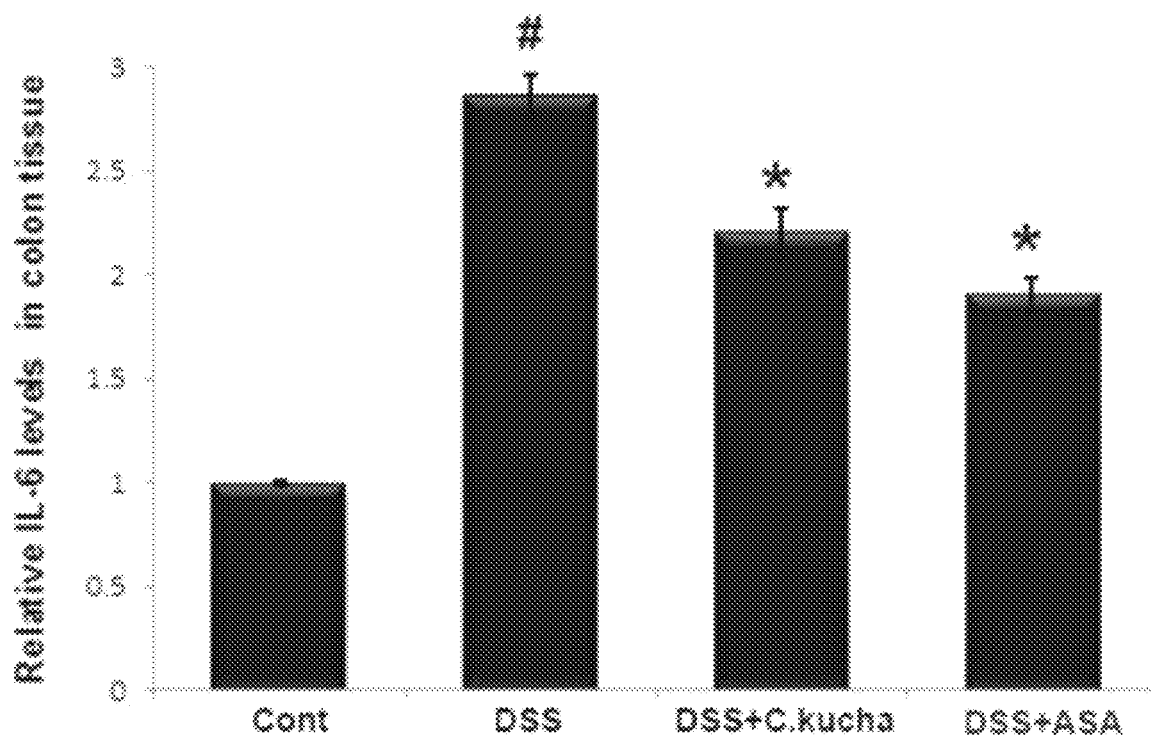
FIG. 6 is a diagram illustrating the IL-6 level of colitis tissue quantified by ELISA after administration of puer tea extract in an ulcerative animal model induced by DSS to a positive control group (5-ASA) and a control group, respectively.

As a result of the experiment, the expression level of IL-6 was significantly increased in the colonic tissues of the DSS single administration group compared to the colonic tissues of the normal group. However, the IL-6 expression level was significantly inhibited in the group administered with puer tea extract compared to the DSS single administration group. In particular, the IL-6 inhibition rate of puer tea extract was approximately 36.3%, which exhibited an effect similar to 5-ASA used as a positive control group (FIG. 6).

Example 8. Inhibitory Effect of Puer Tea Extract on NF-κB Activity in DSS-Induced Ulcerative Colonic Tissue NF-κB is a representative transcription factor regulating the expression of inflammatory mediators and has been reported to be associated with various lesions such as inflammation and cancer. Recently, research results have been reported that NF-κB activity increases in colonic tissues in patients with colitis. In this study, the change in NF-κB activity was measured in DSS-induced colonic tissue to investigate the anti-inflammatory mechanism of puer tea extract in an experimental model of ulcerative colitis. Nucleoproteins were isolated from colonic tissues, and changes in NF-κB activity were measured by a Western blot method.

The experimental mouse model was induced with 3% DSS for 14 days. At the end of the experiment, colorectal tissue was excised and homogenized, the level of NF-B p65 was assessed by Western blot analysis (A of FIG. 7), and the relative expression level of NF-B was measured using an image analyzer (B of FIG. 7).

Figure 7:
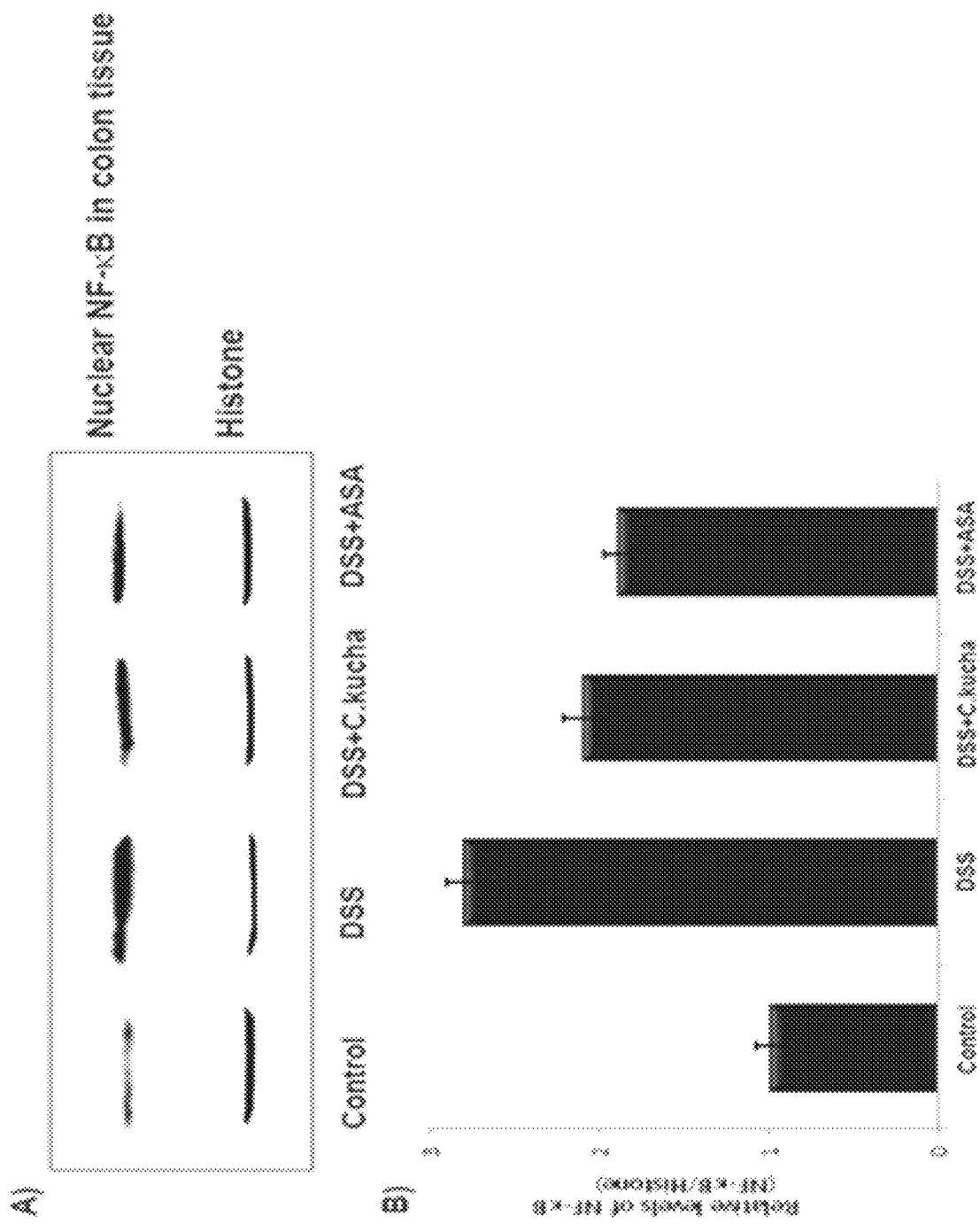
FIG. 7 is a diagram illustrating that puer tea extract in an ulcerative animal model induced by DSS was administered to a positive control group (5-ASA) and a control group, respectively, colorectal tissue was excised and homogenized, and the level of NF-B p65 was evaluated by Western blot analysis (A), and is a diagram illustrating that the relative expression level of NF-B was measured using an image analyzer (B).

As a result of the experiment, it was identified that the NF-κB activity was increased in the DSS single group, but the NF-κB activity was inhibited in the puer tea extract administration group (FIG. 7). Based thereon, it was identified that puer tea extract inhibited the inflammatory response by inhibiting NF-κB activity in the DSS-induced ulcerative colitis experimental model.

Example 9. Antioxidant Effect of Puer Tea Extract: Effect on DPPH and ABTS Radical Scavenging Ability The increase in oxidative stress induces the generation of intracellular reactive oxygen species (ROS), which leads to diseases such as inflammation, cancer, and aging. Recently, the study results have been reported that the increase in active oxygen is associated with the induction of colitis. In this experiment, DPPH and ABTS radical scavenging ability was measured to measure the antioxidant activity of puer tea extract.

Figure 8:
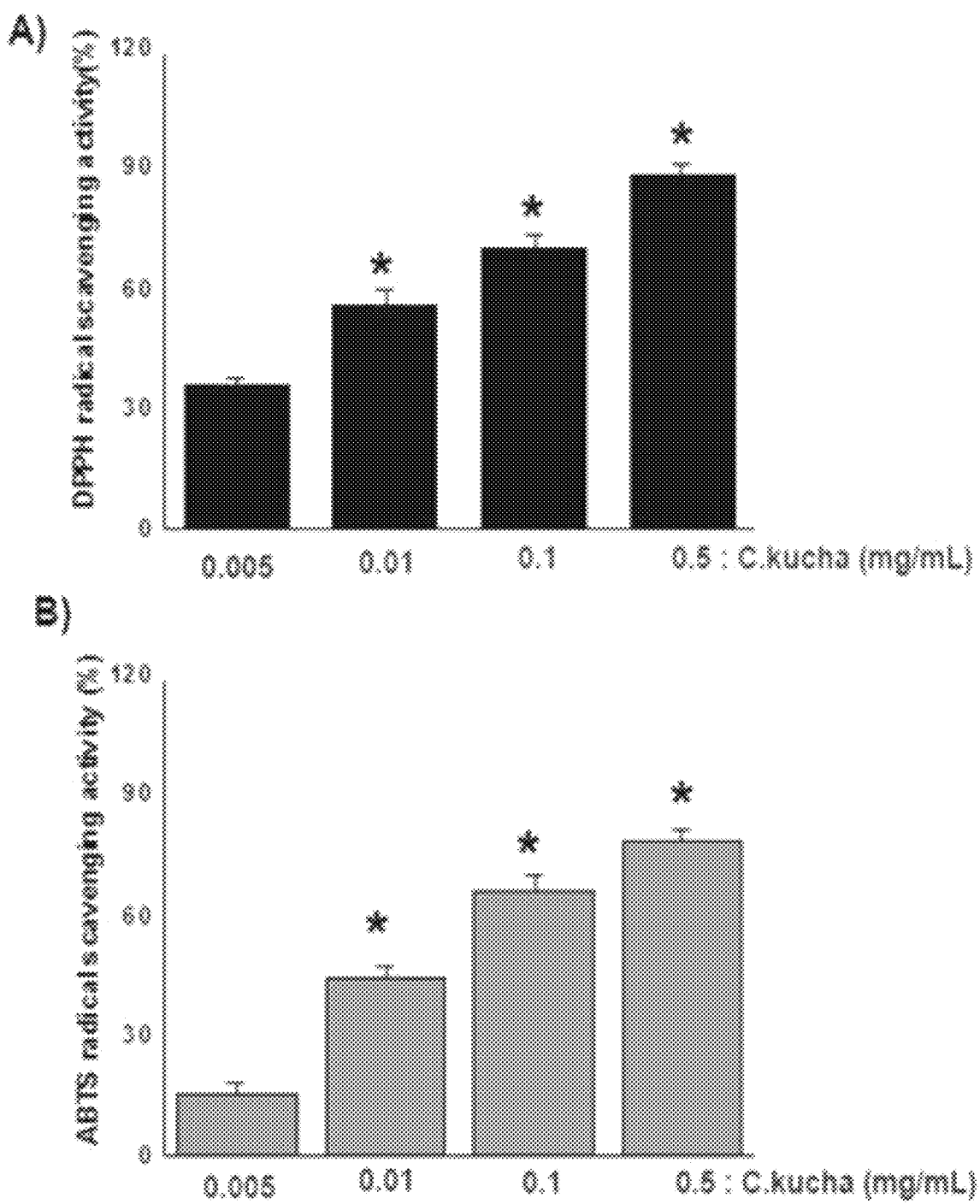
FIG. 8 is a diagram illustrating DPPH scavenging ability to measure antioxidant activity by concentration of puer tea extract in an ulcerative animal model induced by DSS (A), and is a diagram illustrating ABTS radical scavenging ability (B).

As shown in FIG. 8, as a result of the experiment, it was identified that the DPPH and ABTS free radical scavenging ability increased in a concentration-dependent manner in various concentrations of puer tea extract (0.01 to 0.5 mg/mL). In particular, DPPH and ABTS radical scavenging ability of 75.3% and 70.21%, respectively, was measured in a high concentration of puer tea extract (0.5 mg/mL). Based on these results, the effect of inhibiting the active oxygen activity of puer tea extract was demonstrated, and its utility as a functional material was identified.

Example 10. Cytotoxic Effect of Puer Tea Extract on Macrophages

To exclude the possibility that the anti-inflammatory effect of puer tea extract is due to cytotoxicity, cytotoxicity to RAW 264.7 cells was measured using puer tea extract at various concentrations. Macrophages were pretreated with puer tea extract at various concentrations (0.01 to 0.5 mg/mL) and then stimulated with LPS (1 ug/ml) for 24 hours. Thereafter, cell viability was measured using MTT assay.

Cells were treated with puer tea extract (0.01 to 0.5 mg/mL) for 1 hour and then stimulated with LPS (1 μg/ml) for 24 hours, and cytotoxicity was measured by MTT assay. All data were expressed as the mean value±S.E.M of three measurements obtained in three separate experiments. (#P<0.05 vs. control group, *P<0.05 vs. LPS-treated group).

Figure 9:
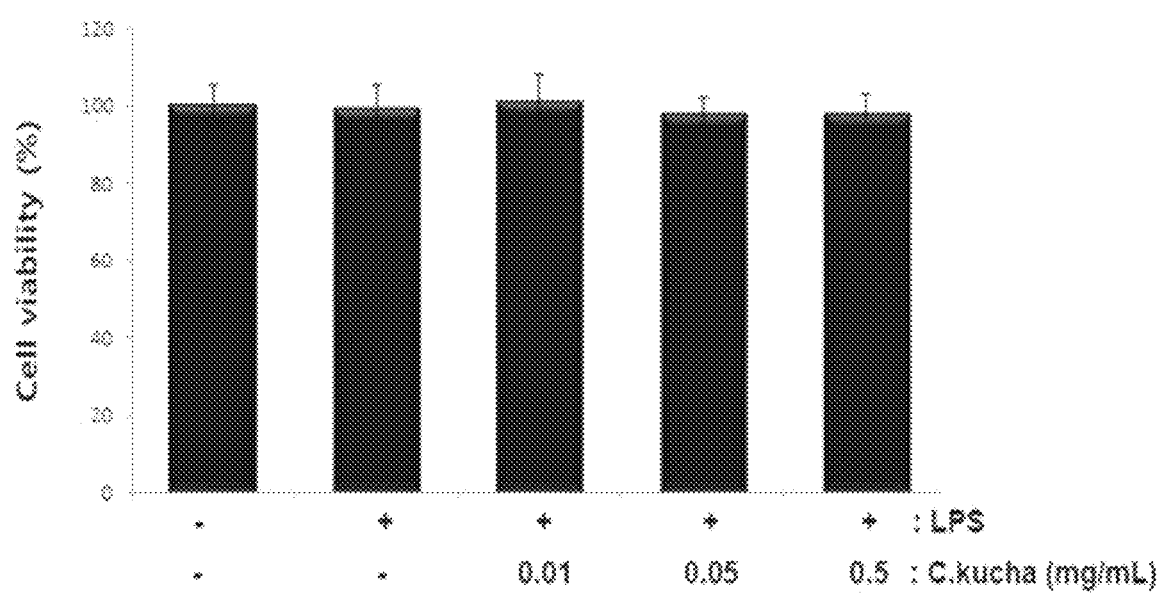
FIG. 9 is a diagram illustrating the effect of puer tea extract on cell viability in Raw 264.7 cells stimulated with LPS by concentration.

As a result of the experiment, it was identified that there was no significant difference in cytotoxicity at various concentrations of puer tea extract (FIG. 9). Therefore, it was identified that puer tea extract did not show any toxicity to cells, and the anti-inflammatory experiment of puer tea extract was conducted in the concentration range of 0.01 to 0.5 mg/ml.

Figure 10:
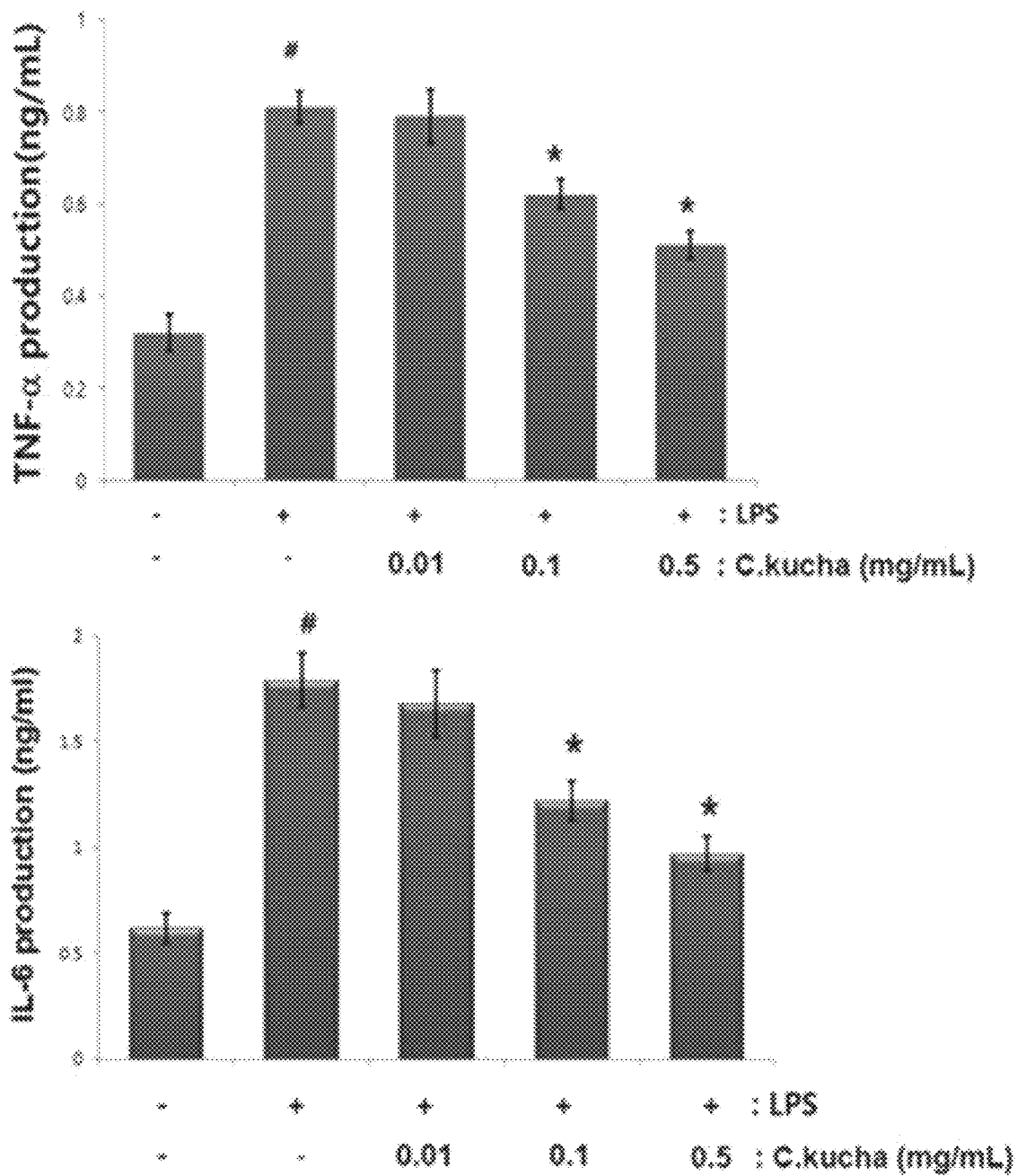
FIG. 10 is a diagram illustrating the effect of puer tea extract on the production of TNF-α and IL-6 in Raw 264.7 cells stimulated with LPS by concentration.

Example 11. Inhibitory Effect of Puer Tea Extract on Inflammatory Cytokine Production in Macrophages TNF-α, a tumor necrosis factor produced in Th1 cells, is known as a major mediator of acute inflammatory response. In addition, when the production of inflammatory cytokines TNF-α and IL-6 in immune cells is increased by various stimuli, overactive immune and inflammatory responses are increased, and thus inhibition of the production of inflammatory cytokines is known as a target that may treat colitis disease. In this study, in order to analyze the anti-inflammatory effect of puer tea extract, the inhibitory effect of TNF-α and IL-6 production in LPS-activated macrophages was measured. After pretreatment with various concentrations of puer tea extract (0.01 to 0.5 mg/mL), cells were stimulated with LPS for 24 hours, and the amount of change in TNF-α and IL-6 secreted from the cells was measured by an ELISA method. As a result of the experiment, the production of TNF-α and IL-6 was significantly increased in the LPS signal treatment group compared to the control group, but was inhibited in a concentration-dependent manner in the group treated with puer tea extract (FIG. 10). In particular, a high concentration (0.5 mg/mL) of puer tea extract showed inhibitory effects on TNF-α and IL-6 by about 33.7% and 38.7%. From this result, it was identified that puer tea extract had an anti-inflammatory effect by inhibiting the production of inflammatory mediators TNF-α and IL-6.

($^{\#}$P<0.05 vs. control group, *P<0.05 vs. LPS-treated group).

Example 12. Inhibitory Effect of Puer Tea Extract on LPS-Induced NO Production in Macrophages NO is an active oxygen species induced in the oxidation process and is a highly reactive biomolecule. It is reported that the excessively generated NO damages biomolecules such as fat and protein in the body to promote inflammatory reactions such as vascular permeability and edema, and in particular acts on tissues to exacerbate the inflammatory response through tissue damage. In this study, the inhibitory effect of puer tea extract on NO production in LPS-activated macrophages was measured. Macrophages were pretreated with puer tea extract at various concentrations (0.01 to 0.5 mg/mL) and stimulated with LPS (1 ug/ml) for 24 hours. Thereafter, the amount of change in NO produced in the cells was measured by a Griess test method.

Figure 11:
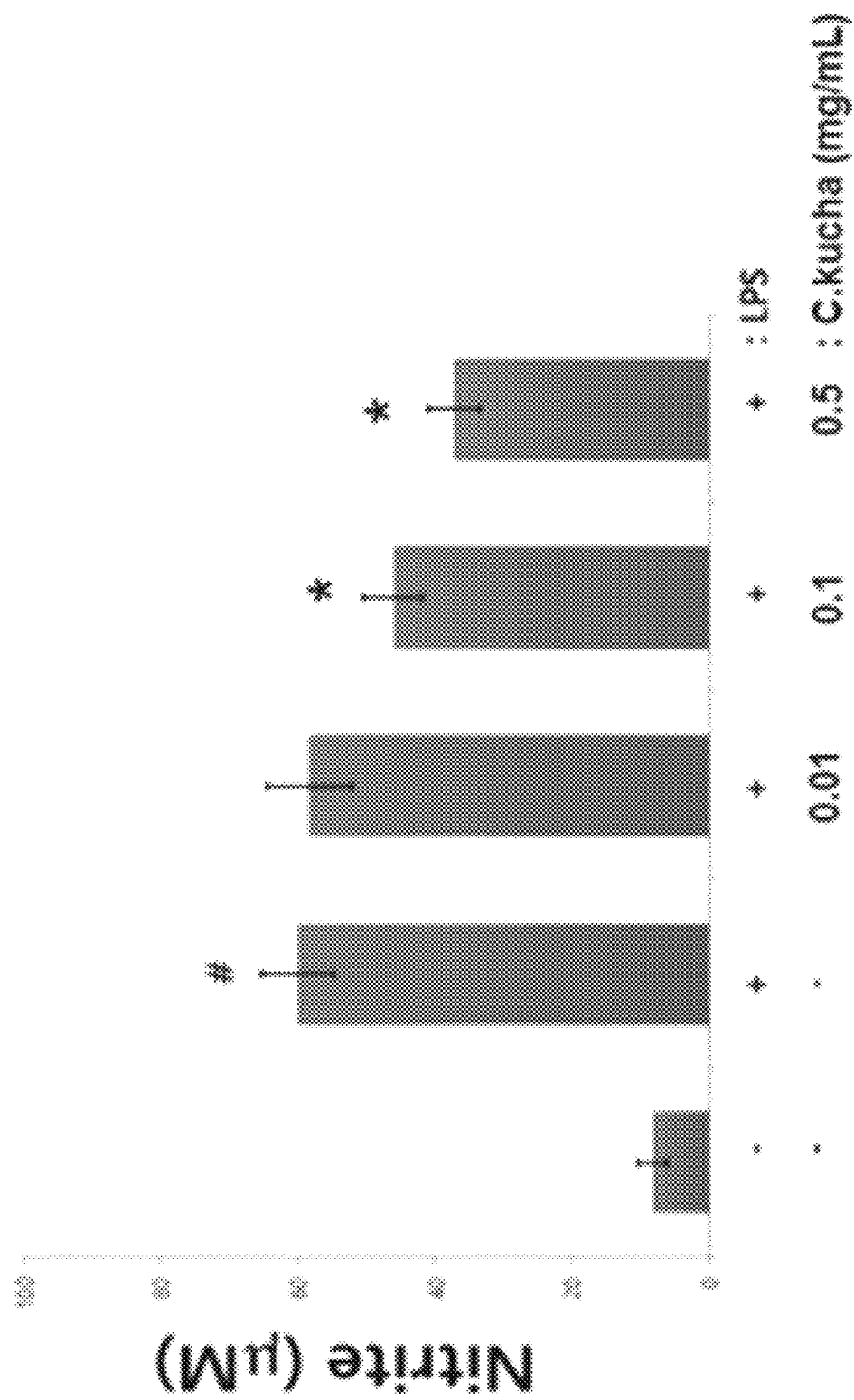
FIG. 11 is a diagram illustrating the effect of puer tea extract on NO production in Raw 264.7 cells stimulated with LPS by concentration.

As a result of the experiment, it was identified that the NO production amount was significantly increased in the LPS single treatment group compared with the control group. However, as the concentration of puer tea extract increased, the amount of NO production of macrophages induced by LPS decreased significantly. In particular, it was identified that a high concentration (0.5 mg/mL) of puer tea extract had an inhibitory effect of about 42.5% (FIG. 11).

(#P<0.05 vs. control group, *P<0.05 vs. LPS-treated group).

Example 13. Inhibitory Effect of Puer Tea on iNOS Expression in Macrophages iNOS, an inducible nitric oxide synthase, induces NO production from L-arginine by increasing its expression by various factors such as bacterial toxins, inflammation, and increased immune response and oxidative stress. In particular, it has been reported that NO production due to increased expression of iNOS plays an important role in the pathophysiology of diseases in various diseases. In this study, in order to measure the anti-inflammatory effect of puer tea extract, the effect of puer tea extract on iNOS expression induced in inflammatory response was measured. The cells were treated with puer tea extract at a concentration of 0.01 to 0.5 mg/mL, and after stimulation with LPS for 24 hours, the iNOS expression level was measured by a Western blot method.

Figure 12:
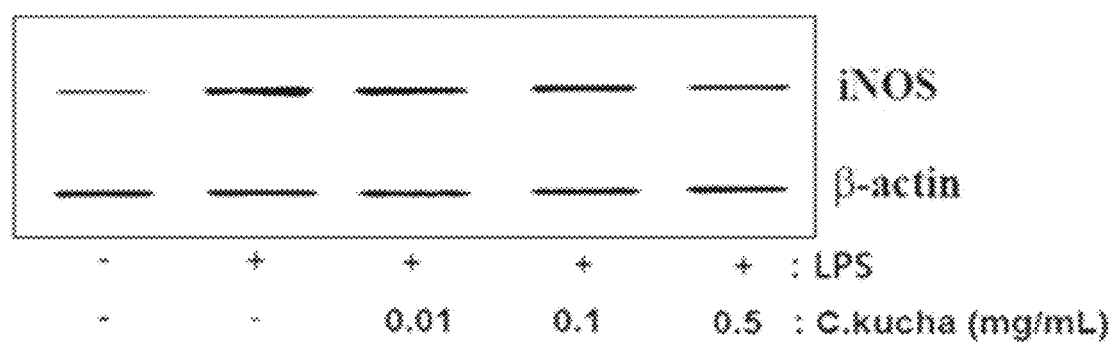
FIG. 12 is a diagram illustrating the effect of puer tea extract on iNOS expression in Raw 264.7 cells stimulated with LPS by concentration.

As a result of the experiment, it was identified that the expression level of iNOS protein was significantly increased in the LPS signal treatment group compared to the control group, but the expression level of iNOS was decreased in a concentration-dependent manner in the group treated with puer tea extract (FIG. 12). From this result, it was identified that puer tea extract had an anti-inflammatory effect by inhibiting the production of iNOS, an inflammatory mediator.

Example 14. Inhibitory Effect of Puer Tea Extract on LPS-Induced COX-2 Expression in Macrophages COX-2 is an enzyme that converts arachidonic acid into prostaglandin, and is known to play an important role in deepening inflammatory lesions by inducing expression in inflammatory tissues due to various factors such as inflammation, tissue damage, and oxidative stress. In this study, in order to measure the anti-inflammatory effect of puer tea extract, the effect of puer tea extract on COX-2 expression level in LPS-activated macrophages was measured. Cells were treated with puer tea extract at a concentration of 0.01 to 0.5 mg/mL and then stimulated with LPS for 24 hours, and then the COX-2 expression level was measured by a Western blot method.

Figure 13:
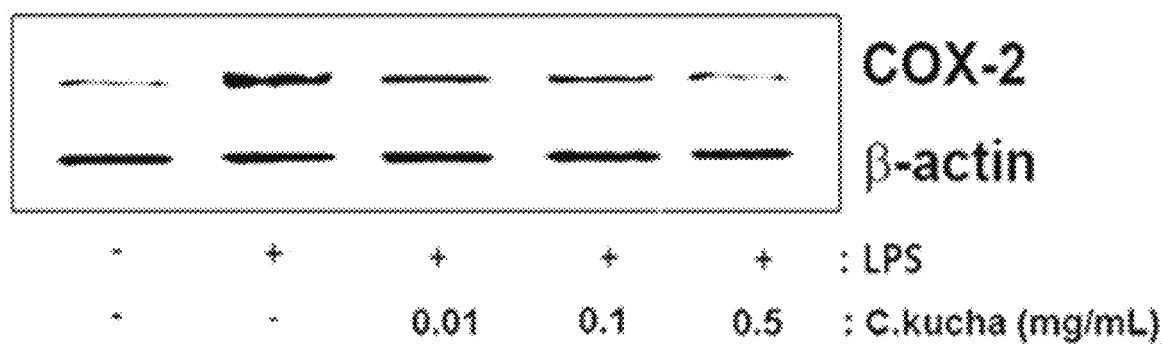
FIG. 13 is a diagram illustrating the effect of puer tea extract on COX-2 expression in Raw 264.7 cells stimulated with LPS by concentration.

As a result of the experiment, it was identified that the expression level of COX-2 was significantly increased in the LPS signal treatment group compared to the control group, but the expression level of COX-2 was inhibited in a concentration-dependent manner in the group treated with puer tea extract (FIG. 13). In particular, it showed an effective inhibitory effect in a high concentration of puer tea extract. Based thereon, it was identified that puer tea extract had an anti-inflammatory effect by regulating the expression of COX-2, an inflammatory mediator.

Example 15. Inhibitory Effect of Puer Tea Extract on LPS-Induced $PGE_2$ Production in Macrophages $PGE_2$, an inflammatory mediator produced by COX-2 in the inflammatory response, dilates blood vessels and increases vascular permeability, thereby inducing leukocyte migration to the inflammatory site, leading to inflammation[15]. In this study, in order to measure the anti-inflammatory effect of puer tea extract, the effect of puer tea extract on $PGE_2$ production induced in the inflammatory response was measured. Cells were treated with puer tea extract at a concentration of 0.01 to 0.5 mg/mL and then stimulated with LPS for 24 hours, and the amount of $PGE_2$ production was measured using a $PGE_2$ assay kit.

Figure 14:
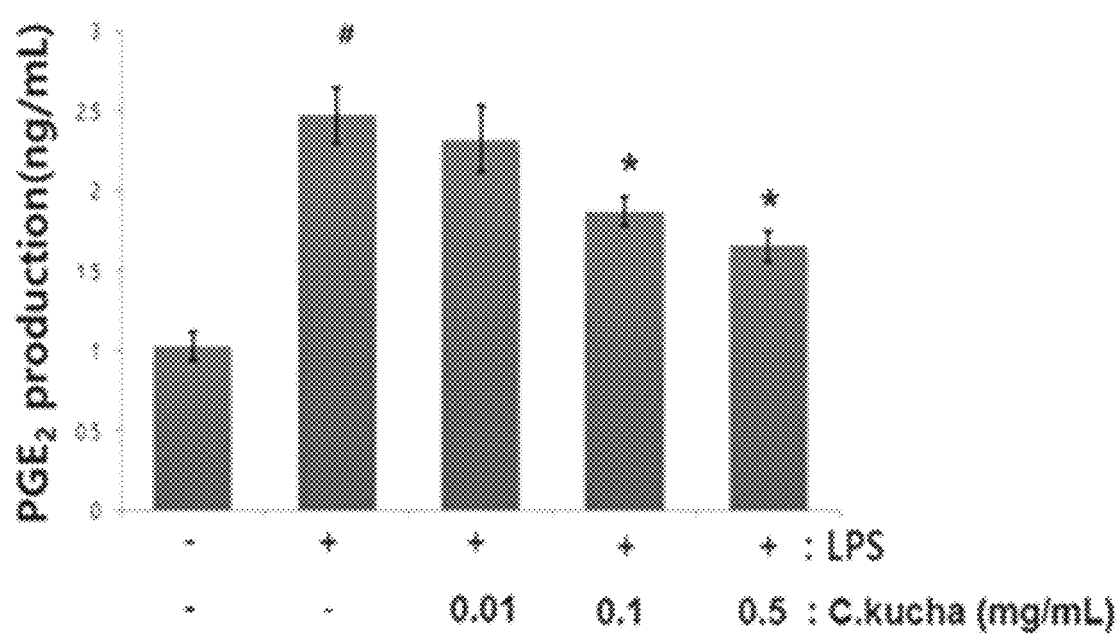
FIG. 14 is a diagram illustrating the influence of puer tea extract on $PGE_2$ production in Raw 264.7 cells stimulated with LPS by concentration.

As a result of the experiment, it was identified that the amount of $PGE_2$ production was significantly increased in the LPS single treatment group compared to the control group, but the amount of $PGE_2$ production was inhibited in a concentration-dependent manner in the group treated with puer tea extract (FIG. 14). In particular, a high concentration (0.5 mg/mL) of puer tea extract showed an inhibitory effect of about 43.1%. Based on these results, it was identified that puer tea extract had an anti-inflammatory effect by inhibiting the production of $PGE_2$, an inflammatory mediator.

(#P<0.05 vs. control group, *P<0.05 vs. LPS-treated group).

Example 16. Investigation of Pharmacological Mechanism of Puer Tea Extract in Macrophages: Inhibitory Effect of Puer Tea on NF-κB Activity NF-κB is a representative transcription factor regulating the expression of inflammatory mediators and has been reported to be associated with various lesions such as inflammation and cancer. NF-κB binds to IκB in the cytoplasm and exists in an inactivated state, but phosphorylation and degradation of IκB are induced by various factors such as bacterial toxins, inflammation, and oxidative stress[16]. Due to this, NF-κB is released and migrates into the nucleus to induce the synthesis of iNOS, COX-2, and inflammatory cytokines. In this study, changes in IκB and NF-κB activity were measured in LPS-activated macrophages to investigate the anti-inflammatory mechanism of puer tea. Cells were treated with puer tea extract (0.1 to 0.5 mg/mL), stimulated with LPS for 2 hours, and then cytoplasm and nucleoprotein were isolated, respectively, and changes in IκB and NF-κB activity were measured by a Western blot method.

Figure 15:
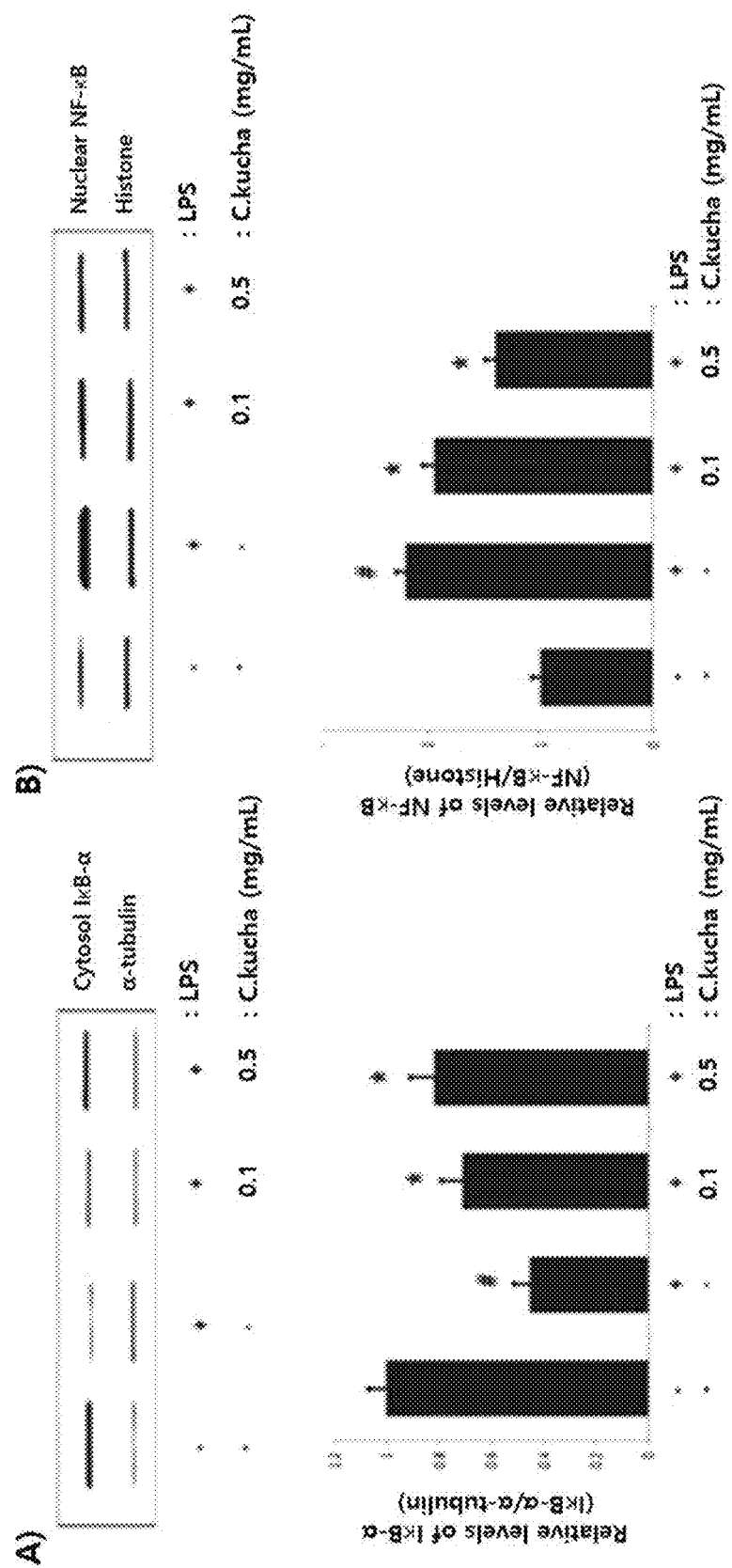
FIG. 15 is a diagram illustrating the effect of puer tea extract on the activation of NF-κB p65 in Raw 264.7 cells stimulated with LPS.

As a result of the experiment, the degradation of IκB in the cytoplasm was increased in the LPS-treated group, and the degradation phenomenon of IκB was inhibited in the group treated with puer tea extract. In addition, the expression level of NF-κBin the nucleus was increased in the LPS-treated group, whereas the expression level of NF-κB in the nucleus was inhibited in the puer tea extract group (FIG. 15). In other words, it was identified that the NF-κB present in the cytoplasm migrated into the nucleus by LPS, whereas the migration of NF-κB into the nucleus was inhibited by the puer tea extract. Based thereon, it was identified that the anti-inflammatory mechanism of puer tea extract in macrophages inhibited the inflammatory response through inhibition of NF-κB activity.

($^{\#}$P<0.05 vs. control group, *P<0.05 vs. LPS-treated group).

What is claimed is:

1. A method for inhibiting inflammatory bowel disease, the method comprising:
    a) placing puer tea leaves in a silver kettle made of silver and pouring boiling water from a copper kettle into the silver kettle to brew the puer tea;
    b) storing the puer tea brewed in step a) in a silver teapot and supplying it to a silver pipkin in fixed quantities over six days;
    c) putting cold water, and the puer tea into a copper pot and heating it directly;
    d) placing the silver pipkin in water inside the copper pot, pouring the puer tea from the silver teapot into the silver pipkin, and covering it with at least one piece of sesame oil-coated Korean paper made by overlapping seven sheets to allow moisture to discharge and prevent external contaminants from entering;
    e) heating the water in the copper pot to 98° C. to 100° C. to indirectly heat the silver pipkin for a period of seven days;
    f) repeating steps a) and b) to replenish the puer tea in the silver pipkin every 24 hours over a period of six days;
    g) once the puer tea in the silver pipkin reaches a predetermined viscosity between 30,000 to 38,000 cP, pouring it onto the inner surface of bamboo shoot leaves and drying it at room temperature to form puer tea cream;
    h) extracting the puer tea cream using hot water to obtain a puer tea extract; and
    i) administering a composition comprising the puer tea extract obtained in step h) as an active ingredient to a subject in need thereof,
    wherein the subject requires inhibiting expression of at least one of NO, iNOS, COX-2, and $PGE_2$.

2. The method of claim 1, wherein the subject requires inhibiting weight loss, colon shortening, diarrhea, and rectal bleeding.

3. The method of claim 1, wherein the subject requires inhibiting an inflammatory response by regulating NF-κB activity.

4. The method of claim 1, wherein the subject requires inhibiting generation of active oxygen by scavenging 1,1-diphenyl-2-picrylhydrazyl (DPPH) and 2,2'-azino-bis-3-ethylbenzthiazoline-6-sulphonic acid (ABTS) free radicals.

5. The method of claim 1, wherein the subject requires inhibiting IκB degradation.

6. The method of claim 1, wherein the puer tea extract is contained in a concentration of 0.01 mg/mL to 1 mg/mL.

7. The method of claim 1, wherein the inflammatory bowel disease is one selected from the group consisting of ulcerative colitis, Crohn's disease, intestinal Bechet's disease, hemorrhagic rectal ulcer, intestinal lesion, and pouchitis.

8. The method of claim 7, wherein the inflammatory bowel disease is ulcerative colitis.

9. The method of claim 7, wherein the subject requires inhibiting expression of NO.

10. The method of claim 7, wherein the subject requires inhibiting expression of iNOS.

11. The method of claim 7, wherein the subject requires inhibiting expression of COX-2.

12. The method of claim 7, wherein the subject requires inhibiting expression of $PGE_2$.

13. The method of claim 7, wherein the subject requires inhibiting expression of NO and iNOS.

14. The method of claim 7, wherein the subject requires inhibiting expression of NO and COX-2.

15. The method of claim 7, wherein the subject requires inhibiting expression of NO and $PGE_2$.

16. The method of claim 7, wherein the subject requires inhibiting expression of NO, iNOS and COX-2.

17. The method of claim 7, wherein the subject requires inhibiting expression of COX-2, and $PGE_2$.

18. The method of claim 7, wherein the subject requires inhibiting expression of NO, iNOS, COX-2, and $PGE_2$.

* * * * *